(12) United States Patent
Yatabe et al.

(10) Patent No.: US 7,567,989 B2
(45) Date of Patent: Jul. 28, 2009

(54) METHOD AND SYSTEM FOR DATA PROCESSING WITH DATA REPLICATION FOR THE SAME

(75) Inventors: Eiji Yatabe, Yokohama (JP); Nobuo Kawamura, Atsugi (JP); Yasuhiro Takahashi, Fujisawa (JP); Hideaki Sunami, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 391 days.

(21) Appl. No.: 11/065,361

(22) Filed: Feb. 25, 2005

(65) Prior Publication Data

US 2006/0074847 A1 Apr. 6, 2006

(30) Foreign Application Priority Data

Sep. 21, 2004 (JP) ............................. 2004-273675

(51) Int. Cl.
G06F 12/00 (2006.01)
G06F 17/30 (2006.01)
(52) U.S. Cl. .................... 707/202; 707/203; 707/204
(58) Field of Classification Search ............. 707/203, 707/204
See application file for complete search history.

(56) References Cited

U.S. PATENT DOCUMENTS 5,170,480 A * 12/1992 Mohan et al. .......... 707/201
5,561,798 A * 10/1996 Haderle et al. ......... 707/202
5,581,750 A * 12/1996 Haderle et al. ......... 707/202
5,873,096 A * 2/1999 Lim et al. ............... 707/201
2003/0167287 A1* 9/2003 Forster .................... 707/203

FOREIGN PATENT DOCUMENTS

JP 2001-175681 6/2001

OTHER PUBLICATIONS

U.S. Appl. No. 09/739,790, filed Dec. 20, 2000, M. Hosoya, et al.

* cited by examiner

Primary Examiner—John Cottingham
Assistant Examiner—Mariela D Reyes
(74) Attorney, Agent, or Firm—Antonelli, Terry, Stout & Kraus, LLP.

(57) ABSTRACT

To guarantee that contents of an update by a transaction in a parallel database management system. A database management system includes a replica database management unit that manages the replica database, records synchronous information at a timing at which one of the transaction generated is valid in every database management unit and other transactions are invalid in every database management unit, extracts update information and the synchronous information for creating the replica database from the update logs, and causes the replica database management unit to import the update information of each transaction that has become valid before the synchronous information was recorded.

2 Claims, 18 Drawing Sheets

METHOD AND SYSTEM FOR DATA PROCESSING WITH DATA REPLICATION FOR THE SAME

CLAIM PRIORITY

The present application claims priority from Japanese application P2004-273675 filed on Sep. 21, 2004, the content of which is hereby incorporated by reference into this application.

BACKGROUND OF THE INVENTION

This invention relates to a replication method for a replica database in a parallel database management system.

In a database replication system, in order to avoid suspension of business due to occurrence of a failure or the like, a computer that performs distribution of data processing tasks and storage of data creates a replica database that is a replica of a master database.

It is necessary that the replica database provides data, whose contents logically match those of the master database, at the time of reference. Therefore, when the master database is updated, it is necessary that the contents of the update are reflected in the replica database. In order to reflect the contents of the update made to the master database in the replica database, a database management system retrieves update information from an update log file, in which the contents of the update made to the master database are recorded, and reflects the contents of the update in the replica database based on the retrieved update information (see JP 2001-175681 A, for instance).

In a parallel database management system based on a Shared-Nothing system in which plural DB access servers are provided and the DB access servers access data areas respectively allocated thereto, the contents of updates made to the data areas respectively allocated to the servers are recorded in update log files that are respectively managed by the servers. Therefore, in order to create a replica of a master database that is managed by the parallel database management system, processing for exporting the updates in a replica database is executed in units of the update log files respectively managed by the DB access servers. In other words, the contents of the updates are imported in the replica database in units of the DB access servers. Through the import processing, the contents of the updates are imported in the replica database in an asynchronous manner.

SUMMARY OF THE INVENTION

With the conventional technique described above, however, no consideration is given to transactions on a master database side. In the case of a transaction where a DB access server updates data in a data area allocated thereto, when the replica database is referred to before import of all of the contents of the update by the transaction is completed, there arises a possibility that only a part of a result of the update by the transaction may be referred to.

In other words, under a state where only a part of the contents of the update by the transaction are imported in the replica database, it is impossible to provide all of the result of the update made to the master database by the transaction using the replica database. Therefore, when the replica database is referred to under such a state where only a part of the contents of the update by the transaction are imported, there arises a possibility that inconsistent data may be referred to.

It is therefore an object of this invention to guarantee that all of the contents of an update by a transaction in an extraction database management system have been imported in a replica database at the time of reference.

This invention provides a data processing method used in a database management system including a plurality of database management units, and a replica database management unit that manages a replica database, the data processing method including: accessing data areas respectively allocated to the plurality of database management units by transactions; creating the replica database by recording update logs generated by the transactions; recording synchronous information in the update logs at a timing at which one of the transaction generated is valid in every database management unit and other transactions are invalid in every database management unit; extracting update information and the synchronous information for creating the replica database from the update logs; and causing the replica database management unit to import the update information of each transaction that has become valid before the synchronous information was recorded.

According to this invention, it becomes possible to guarantee that all of the contents of an update by a transaction in an extraction database management system have been imported in a replica database at the time of reference. As a result, at the time of an alternate operation due to occurrence of a failure to a computer that performs distribution of data processing tasks and storage of data, it becomes possible to provide data, whose consistency has been maintained in units of transactions on a master database side, using a replica database.

DETAILED DESCRIPTION OF THE PREFERRED EMBODIMENTS

Hereinafter, embodiments of this invention will be described in detail with reference to the accompanying drawings.

Figure 1:
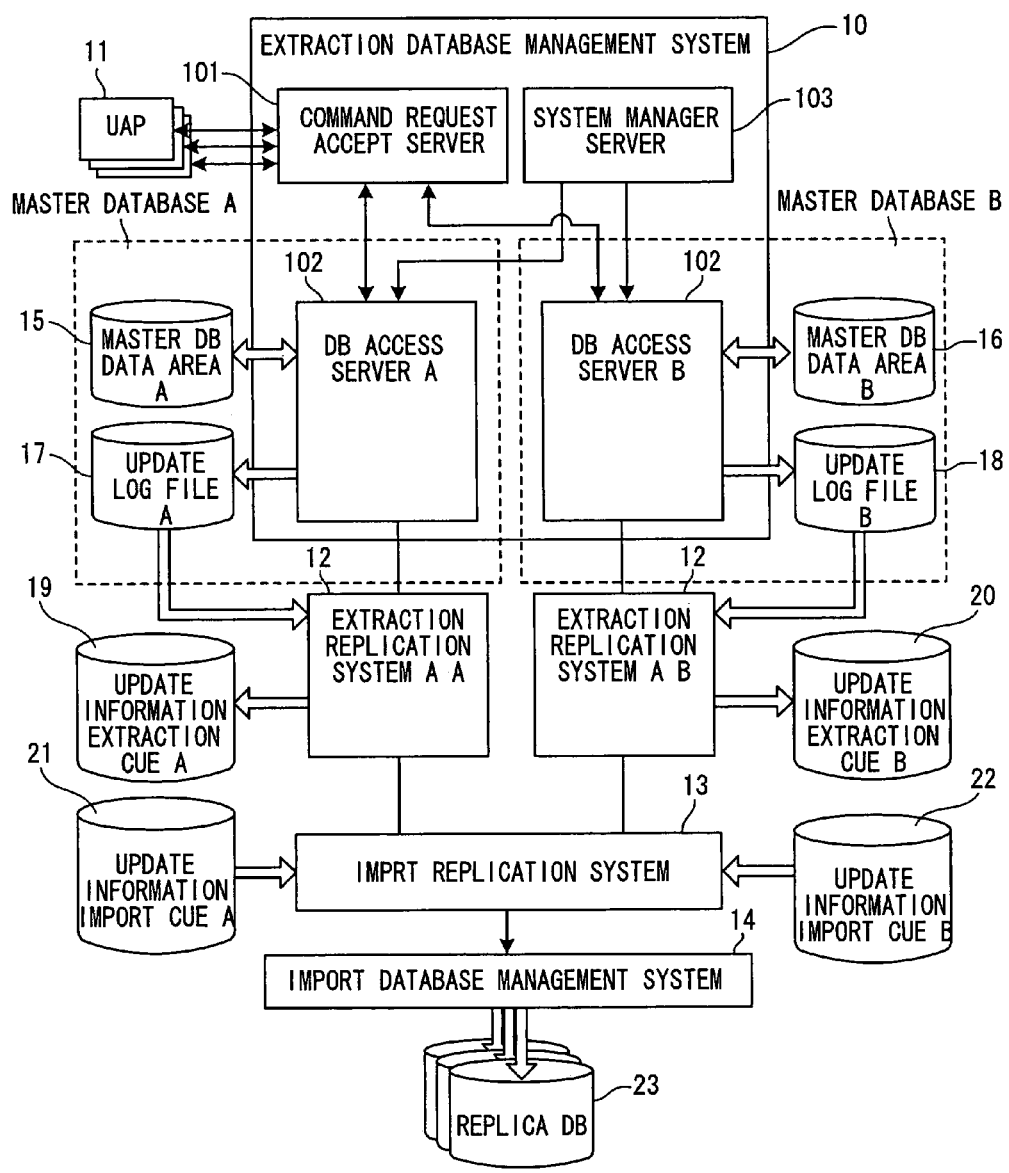
FIG. 1 is a block diagram of a database system according to a first embodiment.

FIG. 1 is a block diagram of a configuration of a database system according to a first embodiment.

The database system shown in FIG. 1 includes an extraction database management system 10, extraction replication systems (A and B) 12, an import replication system 13, and an import database management system 14.

The extraction database management system 10 includes a command request accept server 101, a system manager server 103, and DB access servers (A and B) 102.

The command request accept server 101 functions as a front end server that accepts a command request from a user application (UAP) 11. On accepting the command request, the command request accept server 101 analyzes the command request, generates a data operation request, and sends the data operation request to the DB access servers 102. Then, the command request accept server 101 returns a result of a data operation to the UAP 11 as necessary.

The system manager server 103 manages the extraction database management system 10. Also, the system manager server 103 instructs recording of database synchronous information.

Each DB access server 102 is a back end server constituted of a hard disk or the like that functions as a database management unit that writes and reads data into and from a data area of a master database.

The database system according to this embodiment constitutes a parallel database system based on a Shared-Nothing system. A master database A is stored in a master database (DB) area A 15 by its corresponding DB access server A 102. Also, a master database B is stored in a master database (DB) area B 16 by its corresponding DB access server B 102.

Each DB access server 102 accepts a data operation request from the command request accept server 101 and analyzes the request. Then, according to the request, the DB access server 102 operates data in the data area (master DB data area A 15 or master DB data area B 16) of its corresponding master database. Following this, the DB access server 102 returns a result of the operation to the command request accept server 101 as necessary. Also, the DB access server 102 records an update log file of the master database in its corresponding update log file area (update log file A 17 or update log file B 18). Further, when a synchronous point obtainment command is executed by the system manager server 103 and a synchronous point is obtained, the DB access server 102 records synchronous information in the update log file area at that timing.

Each extraction replication system 12 extracts update information and synchronous information from the update log file of its corresponding master database and stores the extracted information as an update information extraction queue. Then, the extraction replication system 12 transmits the update information and the synchronous information stored in the update information extraction queue to the import replication system 13 at a certain timing in order of transaction completion point.

The extraction replication system A 12 corresponds to the DB access server A 102 and generates an update information extraction queue A 19. On the other hand, the extraction replication system B 12 corresponds to the DB access server B 102 and generates an update information extraction queue B 20.

The import replication system 13 receives update information and synchronous information transmitted from the extraction replication systems 12 and stores the received information in update information import queues (update information import queue A 21 and update information import queue B 22) provided for the respective master databases. Also, the import replication system 13 fetches the stored update information, generates an update request based on the fetched update information, and issues the update request to the import database management system 14.

The import database management system 14 updates data in a replica DB 23 according to the update request from the import replication system 13.

It should be noted that the term "server" means a logical component in the database management system and does not mean a physical apparatus or an information processing apparatus (computer). The function of each server in this embodiment is realized by a program, an object, a process, or a thread. In a like manner, each "system" is also realized by a program, an object, a process, or a thread.

Figure 2:
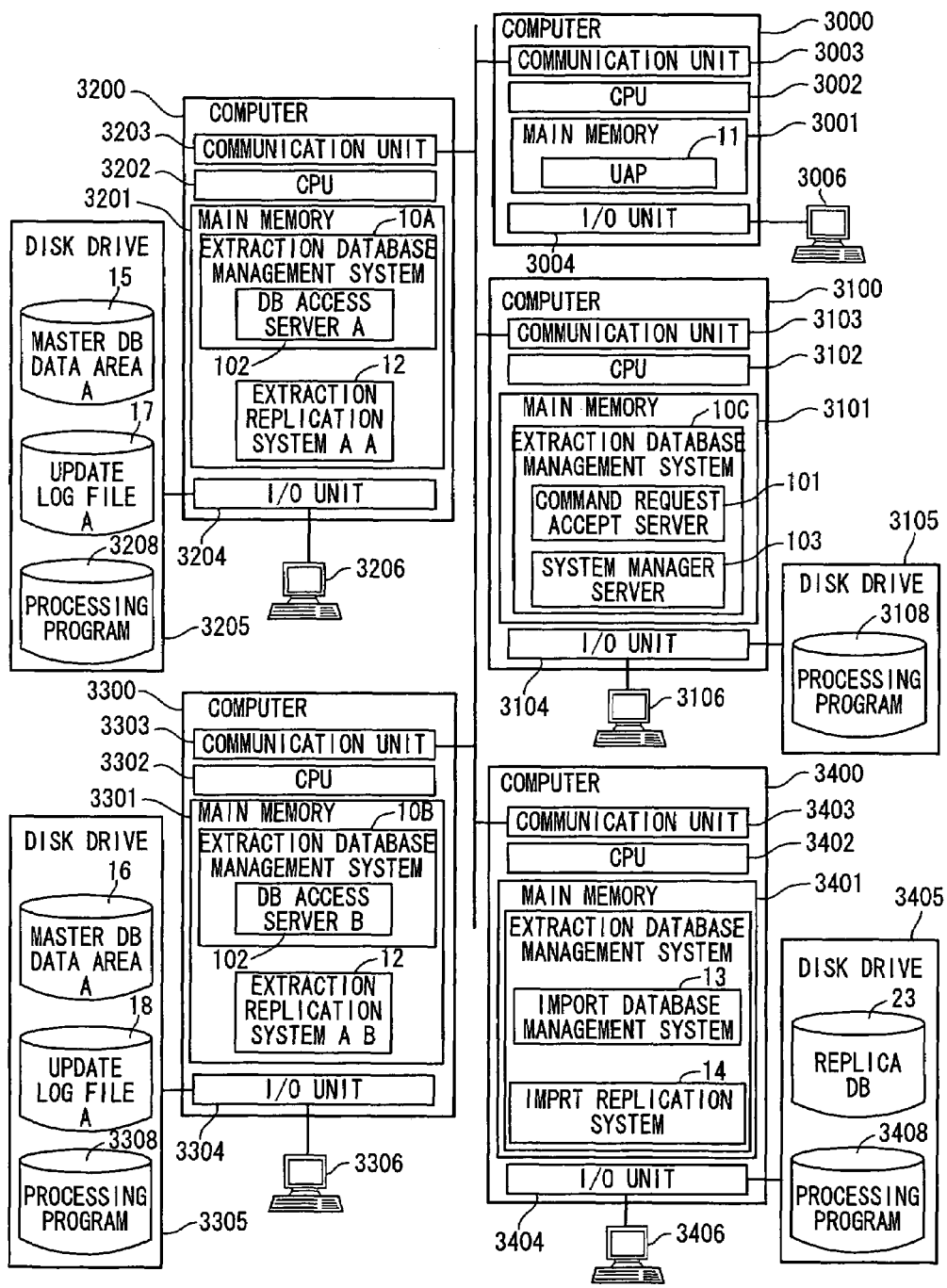
FIG. 2 is a block diagram of an example of a hardware configuration according to the first embodiment.

FIG. 2 is a block diagram showing an example of a hardware configuration of the database system according to the first embodiment.

The database system includes plural computers (3000, 3100, 3200, 3300, and 3400).

Those computers each have the following configuration.

A communication unit (3003, 3103, 3203, 3303, or 3403) is an interface that exchanges data with a network 3007.

A CPU (3002, 3102, 3202, 3302, or 3402) controls processing of the computer by executing a program stored in a main memory (3001, 3101, 3201, 3301, or 3401).

The main memory (3001, 3101, 3201, 3301, or 3401) stores therein data, the program, and the like.

An I/O unit (3004, 3104, 3204, 3304, or 3404) is an interface that receives input from a terminal.

The computer 3000 requests processing by executing the UAP 11 that requests processing to the database. The computer 3100 processes the request from the UAP 11 by executing the command request accept server 101. Also, the computer 3100 obtains a synchronous point by executing the system manager server 103. The computers 3200 and 3300 access the databases by executing the DB access servers 102. Also, the computers 3200 and 3300 extract update logs by executing the extraction replication systems 12. The computer 3400 creates a replica of the databases by executing the import replication system 13.

These computers are connected to each other through the network 3007.

The computer 3000 includes the CPU 3002, the main memory 3001, the communication unit 3003, and the I/O unit 3004. Also, a terminal 3006 is connected to the computer 3000 through the I/O unit 3004.

The UAP 11 is stored in the main memory 3001 and is executed by the CPU 3002. This UAP 11 issues a command request to the command request accept server 101 of the extraction database management system 10C.

This command request is sent by the communication unit 3003 of the computer 3000 to the computer 3100 through the network 3007. The communication unit 3003 of the computer 3100 sends the command request to the command request accept server 101.

The computer 3100 includes the CPU 3102, the main memory 3101, the communication unit 3103, the I/O unit 3104, and a disk drive 3105 such as a hard disk. Also, a terminal 3106 is connected to the computer 3100 through the I/O unit 3104.

The disk drive 3105 stores therein a processing program 3108 that realizes the extraction database management system 10C.

The processing program 3108 is read into the main memory 3101 and is executed by the CPU 3102, thereby functioning as the extraction database management system 10C. This extraction database management system 10C includes the system manager server 103 and the command request accept server 101.

The system manager server 103 and the command request accept server 101 exchange data and requests through the communication unit 3103 with other computers connected to the computer 3100 through the network 3007.

The computer 3200 includes the CPU 3202, the main memory 3201, the communication unit 3203, and the I/O unit 3204. Also, a disk drive 3205, such as a hard disk, and a terminal 3206 are connected to the computer 3200 through the I/O unit 3204.

The disk drive 3205 stores data managed by the extraction database management system 10A in the master DB data area A 15. Also, the disk drive 3205 stores update log data concerning the master DB data area A 15 in the update log file A 17. Further, the disk drive 3205 stores a processing program 3208 that realizes the extraction database management system 10A and the extraction replication system A 12.

The processing program 3208 is read into the main memory 3201 and is executed by the CPU 3202, thereby functioning as the extraction database management system 10A and the extraction replication system A 12. The extraction database management system 10A includes the system DB access server 102A.

The DB access server A 102 and the extraction replication system A 12 read and write data from and into the master DB data area A 15 and the update log file A 17 in the disk drive 3205 through the I/O unit 3204. Also, the DB access server A 102 and the extraction replication system A 12 exchange data and requests through the communication unit 3203 with other computers connected to the computer 3200 through the network 3007.

The computer 3300 includes the CPU 3302, the main memory 3301, the communication unit 3303, and the I/O unit 3304. Also, a disk drive 3305, such as a hard disk, and a terminal 3306 are connected to the computer 3300 through the I/O unit 3304.

The disk drive 3305 stores data managed by the extraction database management system 10B in the master DB data area B 15. Also, the disk drive 3305 stores update log data concerning the master DB data area B 15 in the update log file B 17. Further, in the disk drive 3305, a processing program 3308 that realizes the extraction database management system 10B and the extraction replication system B 12 is stored.

The processing program 3308 is read into the main memory 3301 and is executed by the CPU 3302, thereby functioning as the extraction database management system 10B and the extraction replication system 12B. The extraction database management system 10B includes the system DB access server 102B.

The DB access server B 102 and the extraction replication system B 12 read and write data from and into the master DB data area B 15 and the update log file B 17 in the disk drive 3305 through the I/O unit 3304. Also, the DB access server B 102 and the extraction replication system B 12 exchange data and requests through the communication unit 3303 with other computers connected to the computer 3303 through the network 3007.

The computer 3400 includes the CPU 3402, the main memory 3401, the communication unit 3403, and the I/O unit 3404. Also, a disk drive 3005, such as a hard disk, and a terminal 3006 are connected to the computer 3400 through the I/O unit 3404.

The disk drive 3405 stores therein the replica DB 23 managed by the import database management system 14. Further, the disk drive 3305 stores a processing program 3408 that realizes the import database management system 14 and the import replication system 13.

The processing program 3408 is read into the main memory 3401 and is executed by the CPU 3402, thereby functioning as the import database management system 14 and the import replication system 13.

The DB access server 14 and the import replication system 13 read and write data from and into the replica DB 23 in the disk drive through the I/O unit 3404. Also, the DB access server 14 and the import replication system 13 exchange data and requests through the communication unit 3403 with other computers connected to the computer 3403 through the network 3007.

FIG. 2 shows an example where the five computers function as the UAP 11, the extraction database management system 10, the extraction replication systems 12, the import replication system 13, and the import database management system 14. However, this invention is not limited to this configuration example and another hardware configuration may be used so long as it is possible to realize the functions shown in FIG. 1. In addition, plural functions may be realized with one hardware.

Figure 3A:
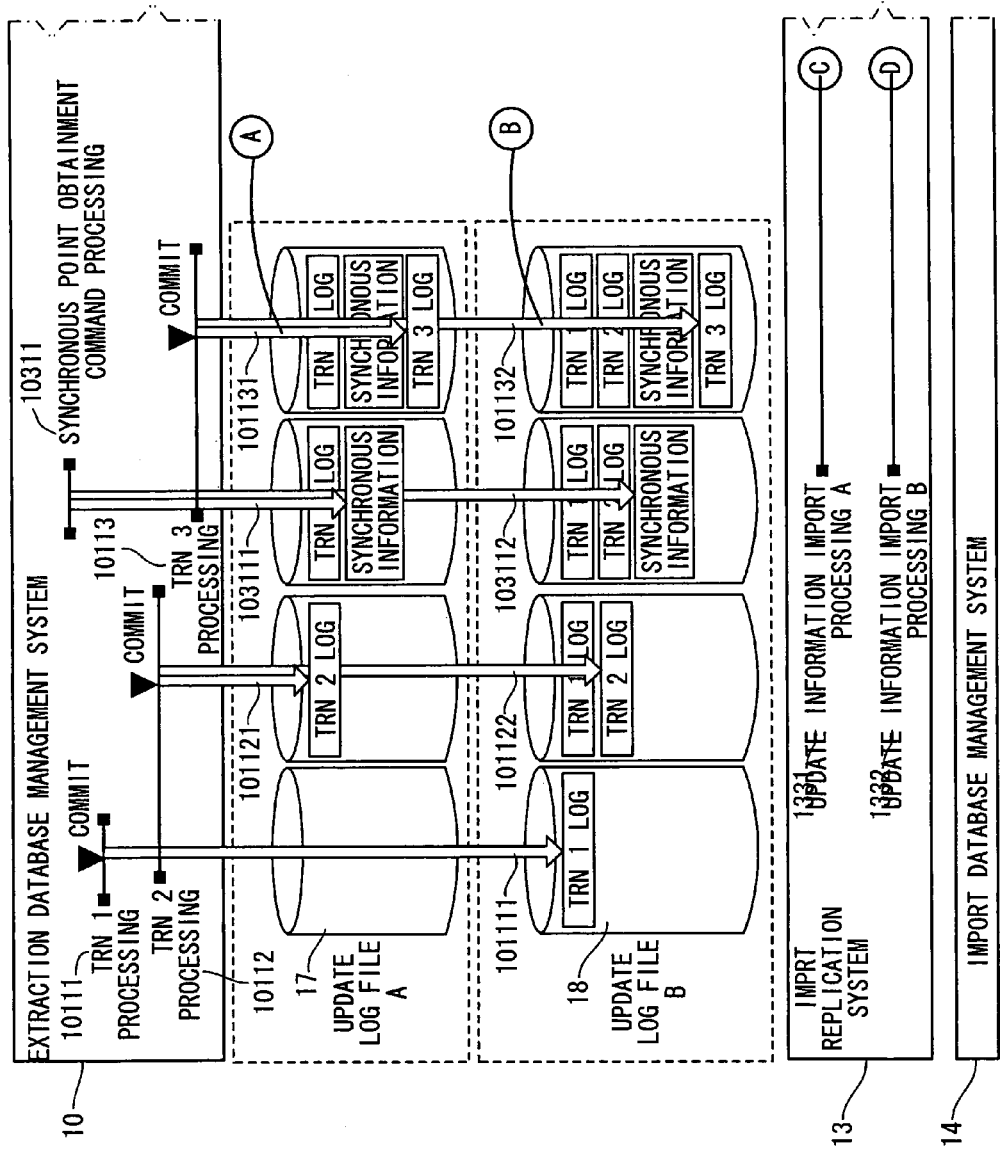
FIG. 3A is a configuration diagram of processing of the system according to the first embodiment.
Figure 3B:
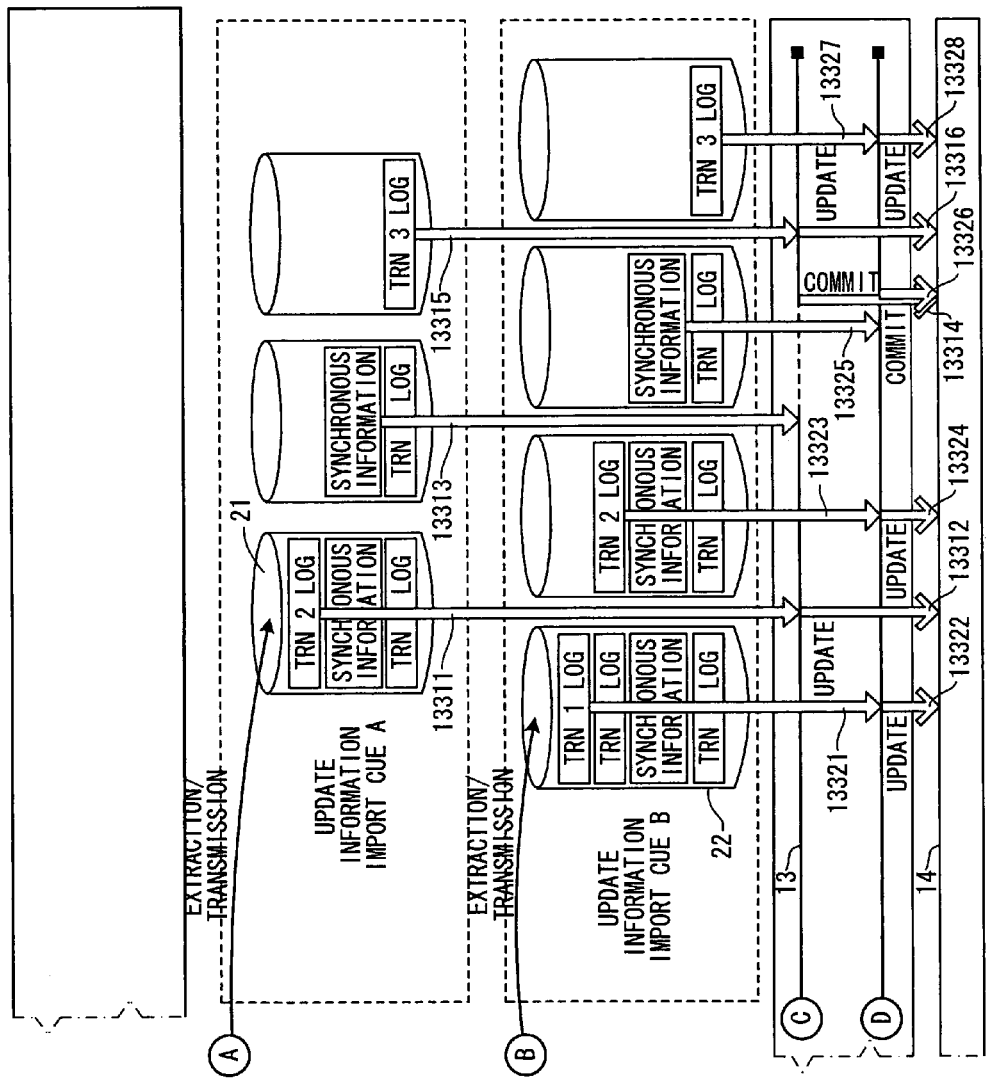
FIG. 3B is a configuration diagram of processing of the system according to the first embodiment.

FIGS. 3A and 3B are configuration diagrams of processing of the database system according to the first embodiment of this invention.

FIGS. 3A and 3B show processing; which the extraction database management system 10 performs with respect to the update log files A 17 and B 18, in a time series manner starting from the left side of the FIG. 3A to the FIG. 3B. Also, FIGS. 3A and 3B show processing, in which the import replication system 13 obtains data from the update information import queues A 21 and B 22 and causes the import database management system 14 to import the obtained data, in a time series manner starting from the left side of the drawing.

In response to a request from the UAP 11 or the like, the extraction database management system 10 generates a transaction 1 (TRN 1), a transaction 2 (TRN 2), and a transaction 3 (TRN 3). Those transactions are respectively processed through TRN 1 processing 10111, TRN 2 processing 10112, and TRN 3 processing 10113. It should be noted that the TRN 1 is processed only with respect to the master database A and the TRN 2 and the TRN 3 are processed with respect to the master databases A and B.

In the processing of each transaction, on receiving a COMMIT request from the UAP 11 or the like, the extraction database management system 10 records a log of the transaction in each corresponding update log file, thereby determining the transaction.

On receiving the COMMIT request, the TRN 1 processing 10111 records a COMMIT log of the TRN 1 in the update log file B18 (101111). As a result of the recording of the log in the update log file, the transaction 1 becomes valid.

In a similar way, in receiving the COMMIT request, the TRN 2 processing 10112 records a COMMIT log of the transaction 2 in the update log file A 17 and the update log file B 18 (101121 and 101122). As a result of the recording of the log in the update log file, the transaction 2 becomes valid.

A case where a synchronous point obtainment command is issued from the system manager server 103 or the like under this state will be described. When the synchronous point obtainment command is issued, this command is processed by synchronous point obtainment command processing 10311.

The synchronous point obtainment command processing 10311 obtains a timing, at which each transaction is placed under one of a state where the transaction is completed in every DB access server 102 and a state where the transaction is not completed in any of the DB access servers 102, as a synchronous point.

In the example shown in FIG. 3, the TRN 1 and the TRN 2 are completed in every DB access server. On the other hand, the TRN 3 is not completed in any of the DB access servers. Accordingly, at this timing, the synchronous point is obtained.

When obtaining the synchronous point, the synchronous point obtainment command processing 10311 records synchronous information in the update log file A 17 and the update log file B 18 at that timing (103111 and 103112).

Next, in the TRN 3 processing 10113, on receiving a COMMIT request, a COMMIT log of the transaction 3 is recorded in the update log file A 17 and the update log file B 18 (101131 and 101132). As a result, the transaction 3 becomes valid.

Through the processing described above, the extraction database management system records the TRN logs and the synchronous information in the update log files.

The extraction replication systems 12 contained in the extraction database management system 10 extracts the update logs and the synchronous information recorded in the update log files A 17 and B 18 at a predetermined timing and transmits them to the import replication system 13. The import replication system 13 stores the transmitted update logs and synchronous information in the update information import queues A 21 and B 22.

The import replication system 13 reads the update information and the synchronous information stored in the update information import queues and processes the read information through update information import processing.

The update information and the synchronous information stored in the update information import queue A 21 are read by update information import processing A 1331. In a like manner, the update information and the synchronous information stored in the update information import queue B 22 are read by update information import processing B 1332.

First, the update information import processing B 1332 reads the update information of the TRN 1 from the update information import queue B 22 (13321) and issues an update request to the import database management system 14 (13322).

Next, the update information import processing A 1331 reads the update information of the TRN 2 from the update information import queue A 21 (13311) and issues an update request to the import database management system 14 (13312). Next, the update information import processing B 1332 reads the update information of the TRN 2 from the update information import queue B 22 (13323). Then, the update information import processing B 1332 transmits the read update information to the import database management system 14 as an update request (13324).

Then, the update information import processing A 1331 reads the synchronous information from the update information import queue A 21 (13313). Following this, the update information import processing A 1331 waits until the update information import processing B 1332 detects the synchronous information. When the update information import processing B 1332 reads the synchronous information from the update information import queue B 22 (13325), the update information import processing A 1331 and the update information import processing B 1332 send COMMIT requests to the import database management system 14 (13314 and 13326).

On receiving the COMMIT requests, the import database management system 14 imports the update information, which it has already received as the update requests, in the replica DB 23. As a result, the update information of the TRN 1 and the update information of the TRN 2 are determined.

Then, the update information import processing A 1331 reads the update information of the TRN 3 from the update information import queue A 21 (13315) and issues an update request to the import database management system 14 (13316). Next, the update information import processing B 1332 reads the update information of the TRN 3 from the update information import queue B 22 (13327) and sends an update request to the import database management system 14 (13328).

Following this, when the update information import processing A 1331 and the update information import processing B 1332 detect synchronous information and issue COMMIT requests to the import database management system 14 again, the update information of the TRN 3 is determined.

As shown in FIG. 3, the extraction database management system 10 obtains a synchronous point and informs the import processing of the import replication system 13 of the timing thereof. The import replication system 13 imports all of the update contents of each transaction, which has become valid before the synchronous point, in the replica database managed by the import database management system 14 at the timing of the synchronous point. Through this processing, a situation is prevented in which the replica database is referred to under a state where only a part of the contents of an update by a transaction is imported. As a result, it becomes possible to guarantee that all of the contents of an update by a transaction have been imported in the replica database at the time of reference.

It should be noted that in order to inform the import replication system 13 of the timing of the synchronous point, a method is used with which synchronous information is recorded in the update log files by a synchronous point obtainment command and the import replication system 13 detects this synchronous information. However, this invention is not limited to this method and another method may be used so long as it is possible for the update information import processing to identify update information of each transaction that became valid before the synchronous point.

Figure 4:
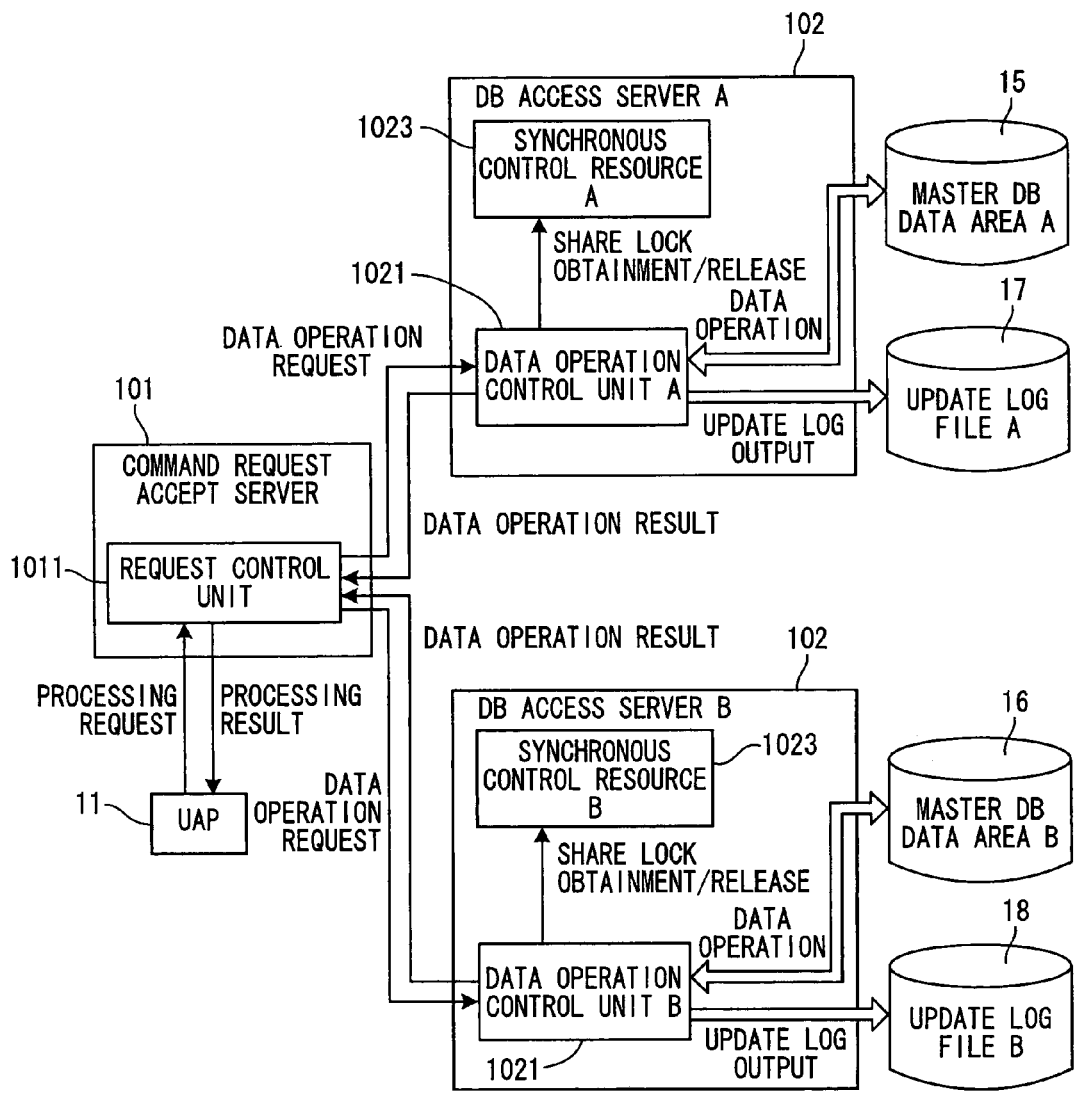
FIG. 4 is a block diagram of transaction processing according to the first embodiment.

FIG. 4 is a block diagram of transaction processing performed in the extraction database management system 10.

This transaction processing is realized by the command request accept server 101 and the DB access servers 102.

The UAP 11 issues a command request to the extraction database management system 10.

A request control unit 1011 of the command request accept server 101 accepts this command request and analyzes the contents of the command request. Then, the command request accept server 101 creates a data operation request from a result of this analysis. Next, the command request accept server 101 sends the data operation request to the DB access server (A or B) 102 that manages the database (master DB data area A 15 or the master DB data area B 16) in which data to be operated is stored.

When this data operation request is a COMMIT request, the request control unit 1011 sends the COMMIT request to the DB access server using a two-phase COMMIT protocol. With the two-phase COMMIT protocol, the request control unit 1011 issues a COMMIT preparation request (PREPARE-COMMIT request) prior to the COMMIT request and waits until preparation is completed. Then, at a point in time when the preparation is completed, the request control unit 1011 sends the COMMIT request for COMMIT execution.

The data operation request sent by the request control unit 1011 is received by a data operation control unit 1021 of the DB access server 102.

The data operation control unit 1021 analyzes the contents of the received data operation request and performs a data operation with respect to the master DB data area (master DB data area A 15 or master DB data area B 16). Also, the data operation control unit 1021 stores the update log of the data operation in the update log file (update log file A 17 or update log file B 18). Further, when receiving a PREPARE-COMMIT request from the request control unit 1011, the data operation control unit 1021 obtains a share lock of a synchronous control resource 1023 at the time of start of the processing. After obtaining the share lock, when receiving a COMMIT request, the data operation control unit 1021 performs COMMIT processing with respect to the master DB data area. Following this, when the processing is ended, the data operation control unit 1021 releases the lock of the synchronous control resource 1023. Also, the data operation control unit 1021 returns a result of the data operation to the request control unit 1011 as necessary.

The processing of the data operation control unit 1021 will be described in detail with reference to FIG. 9.

As described above, during a COMMIT processing period, the data operation processing unit 1021 obtains the share lock of the synchronous control resource 1023. With the share lock, exclusive control is performed with respect to processing at the time of execution of a synchronous point obtainment command to be described later with reference to FIG. 5. Also, with the share lock, lock obtainment waiting will not occur in COMMIT processing between user application programs.

Figure 5:
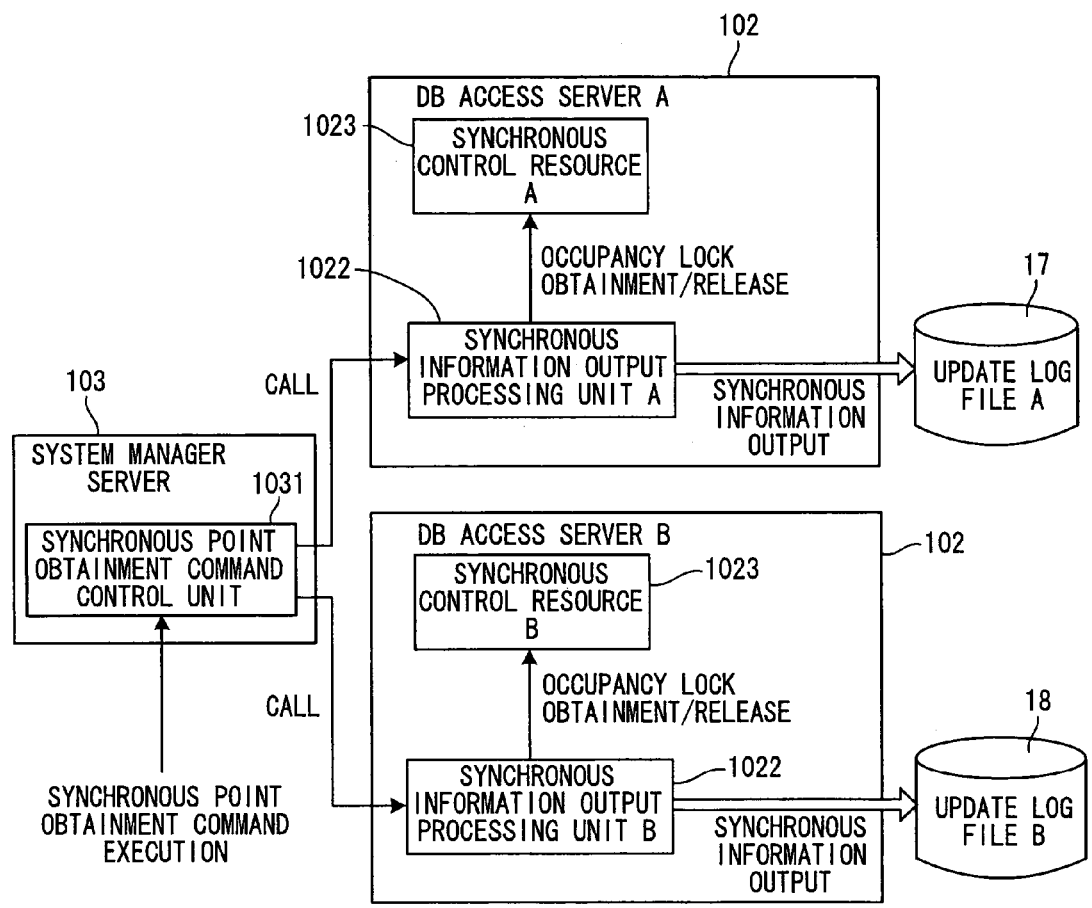
FIG. 5 is a block diagram of synchronous point obtainment processing according to the first embodiment.

FIG. 5 is a block diagram of synchronous point obtainment processing performed in the extraction database management system 10.

Control at the time of execution of a synchronous point obtainment command is realized by the system manager server 103 and the DB access servers 102.

In the extraction database management system 10, a synchronous point obtainment command is executed with respect to the system manager server 103.

On receiving the synchronous point obtainment command, a synchronous point obtainment command control unit 1031 of the system manager server 103 invokes synchronous information output processing units (A and B) 1022 of all the DB access servers (A and B) 102.

Each invocated synchronous information output processing unit 1022 starts synchronous point obtainment processing. When doing so, the synchronous information output processing unit 1022 obtains an occupancy lock with respect to the synchronous control resource 1023. Next, the synchronous information output processing unit 1022 outputs synchronous information to the update log file (update log file A 17 or update log file B 18), thereby obtaining a synchronous point. When the synchronous point obtainment processing ended, the synchronous information output processing unit 1022 releases the occupancy lock with respect to the synchronous control resource 1023.

The processing of the synchronous point obtainment command control unit 1031 and the synchronous information output processing unit 1022 will be described in detail with reference to FIG. 10.

In the manner described above, the synchronous information output processing unit 1022 obtains a synchronous point by outputting synchronous information to the update log file. By obtaining the occupancy lock of the synchronous control resource 1023 during the synchronous information output processing, exclusive control is performed with respect to COMMIT processing performed in data operation processing by another command request from the UAP 11 or the like.

Figure 6:
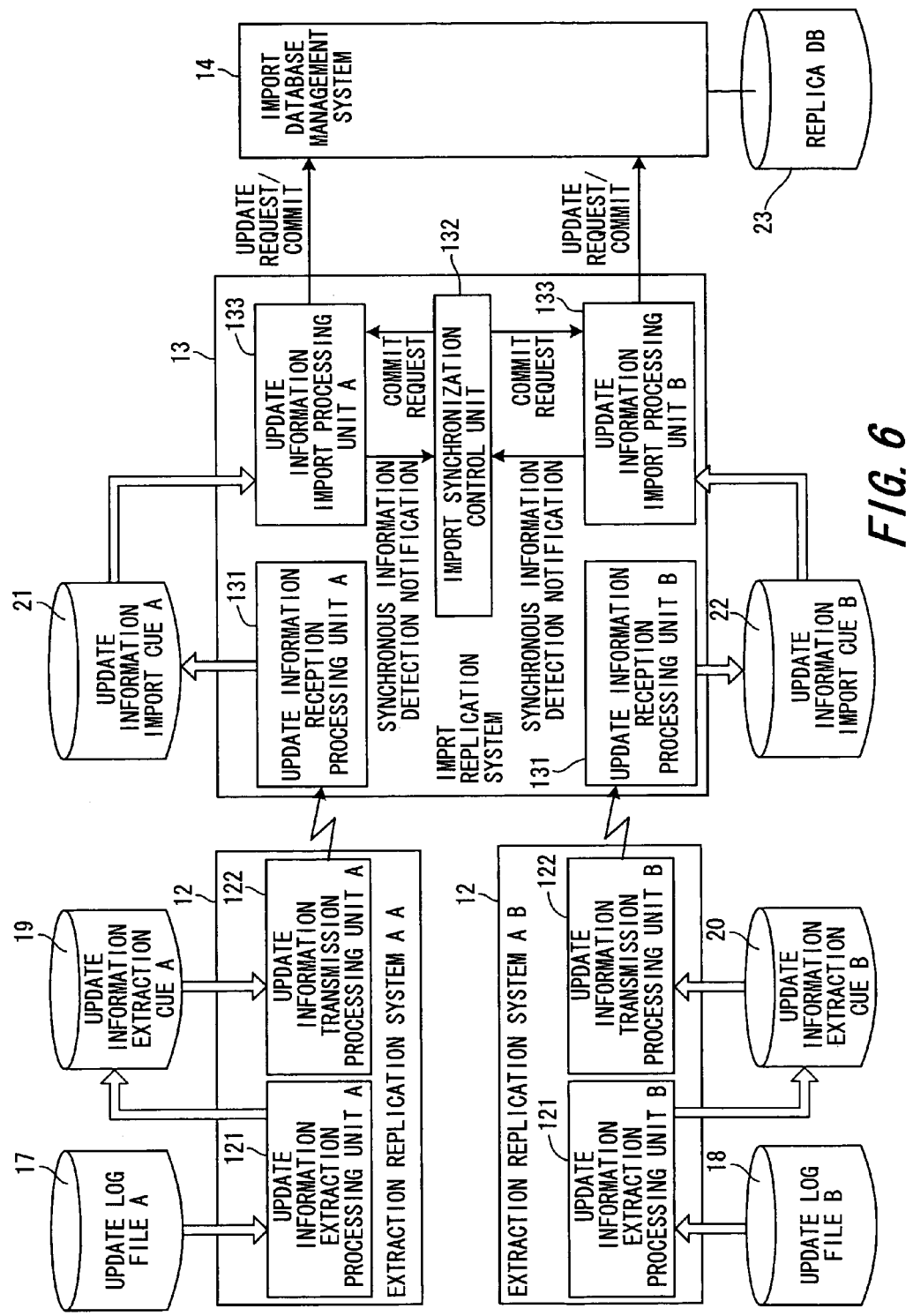
FIG. 6 is a functional block diagram of an extraction replication system and an import replication system according to the first embodiment.

FIG. 6 is a functional block diagram of the extraction replication systems 12 and the import replication system 13 according to this embodiment.

Replication generation processing according to this embodiment is realized by the extraction replication systems (A and B) 12, the import replication system 13, and the import database management system 14.

In each extraction replication system 12, an update information extraction processing unit 121 extracts update information and synchronous information from its corresponding update log file (update log file A 17 or update log file B 18) managed by the extraction database management system 10. The update information extraction processing unit 121 extracts the update information and the synchronous information at a timing determined in advance. Then, the update information extraction processing unit 121 stores the extracted update information and synchronous information in its corresponding update information extraction queue (update information extraction queue A 19 or update information extraction queue B 20).

The processing of the update information extraction processing unit 121 will be described in detail with reference to FIG. 11.

An update information transmission processing unit 122 transmits the update information and the synchronous information stored in the update information extraction queue (update information extraction queue A 19 or update information extraction queue B 20) to the import replication system 13 at a predetermined timing. When doing so, the update information transmission processing unit 122 transmits the update information and the synchronous information in order of transaction completion point.

In the import replication system 13, each update information reception processing unit 131 receives information transmitted from its corresponding extraction replication system 12 and stores the received information in its corresponding one of the update information import queues (update information import queue A 21 and update information import queue B 22) respectively held for each of the extraction replication systems 12.

The processing of the update information transmission processing unit 122 and the update information reception processing unit 131 will be described in detail with reference to FIG. 12.

Each update information import processing unit 133 reads the update information stored in its corresponding update information import queue (update information import queue A 21 or update information import queue B 22), generates an update request, and issues the update request to the import database management system 14.

Also, when detecting that the information read from the update information import queue is the synchronous information, the update information import processing unit 133 issues a synchronous information detection notification to an import synchronization control unit 132. After issuing the synchronous information detection notification, the update information import processing unit 133 waits until a COMMIT request is sent from the import synchronization control unit 132.

After receiving the synchronous information detection notification from one of the update information import processing units (A and B) 133, the import synchronization control unit 132 waits until it receives the synchronous information detection notification from all the other update information import processing units 133. Following this, when receiving the synchronous information detection notification from every update information import processing unit 133, the import synchronization control unit 132 issues a COMMIT request to every update information import processing unit 133.

On receiving the COMMIT request from the import synchronization control unit 132, the update information import processing unit 133 sends the COMMIT request to the import database management system 14.

On receiving the COMMIT request, the import database management system 14 imports data contained in the update requests, which it has already received, in the replica DB 23.

The processing of the update information import processing unit 133 and the import synchronization control unit 132 will be described in detail with reference to FIG. 13.

As described above, with the import synchronization control unit 132, control is performed so that synchronization of the issuance of the COMMIT request to the import database management system 14 by each update information import processing unit 133 is established.

Figure 7:
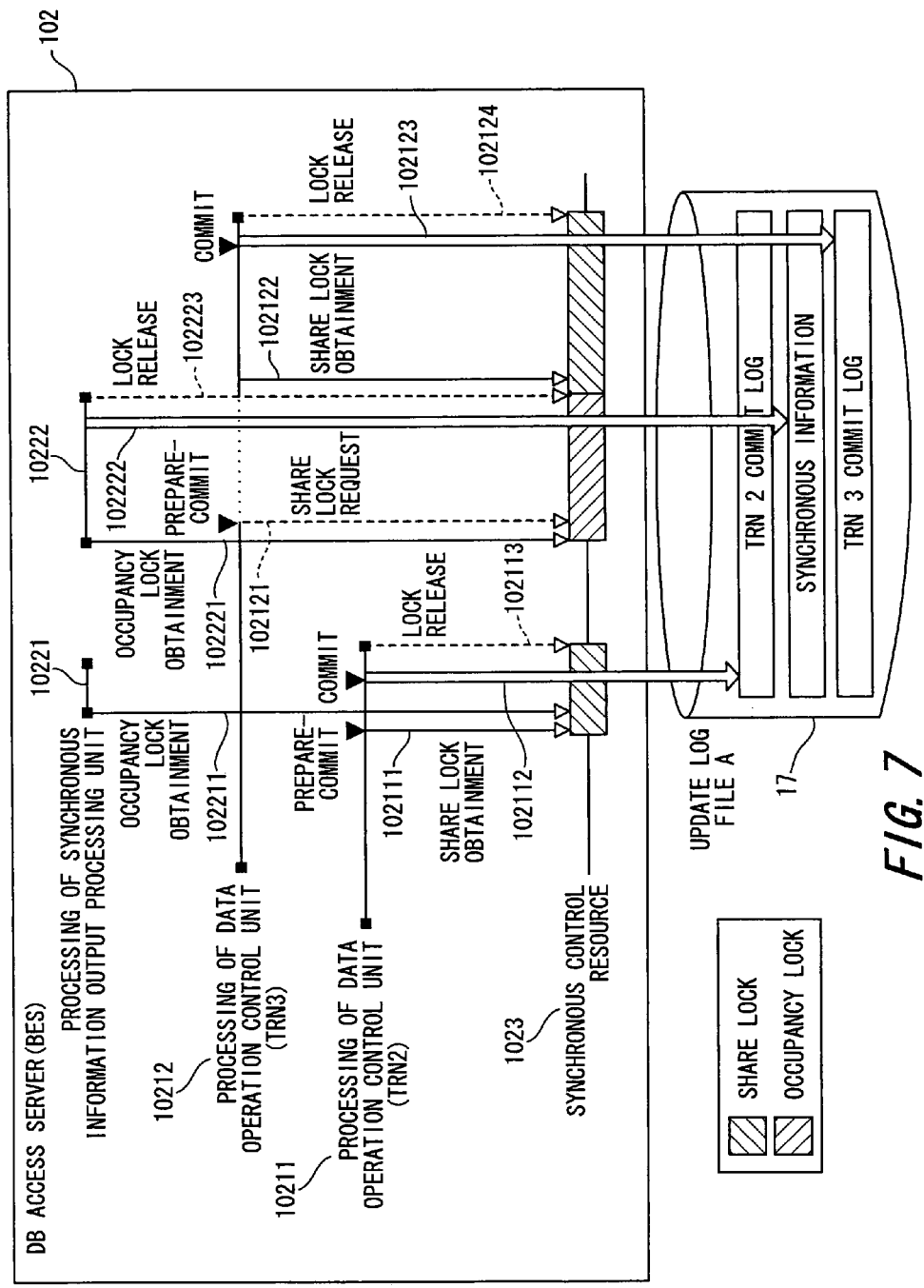
FIG. 7 is an explanatory diagram of exclusive control of the synchronous point obtainment processing according to the first embodiment.

FIG. 7 is an explanatory diagram of the exclusive control of the synchronous point obtainment processing.

FIG. 7 shows an example where in the DB access server 102, during execution of processing 10211 of the data operation control unit with respect to the transaction 2 and processing 10212 of the data operation control unit with respect to the transaction 3, a synchronous point obtainment command is executed.

In the DB access server 102, on receiving a PREPARE-COMMIT request, the processing 10211 of the data operation control unit that processes the transaction 2 (TRN 2) obtains the share lock of the synchronous control resource 1023 (102111). Next, on receiving a COMMIT request, the processing 10211 outputs a COMMIT log of the TRN 2 to the update log file A 17 (102112). Following this, when this processing is completed, the processing 10211 releases the obtained lock of the synchronous control resource 1023 (102113).

A case will be described where, during the processing 10211 of the data operation control unit with respect to the TRN 2, processing 10221 of the synchronous information output processing unit issues an occupancy lock request to the synchronous control resource (102211).

However, the processing 10211 of the data operation control unit with respect to the TRN 2 has already obtained the share lock with respect to the synchronous control resource 1023, so the occupancy. lock request 102211 of the processing 10221 of the synchronous information output processing unit ends in failure. Therefore, the processing 10221 of the synchronous information output processing unit ends and waits for a predetermined period of time.

Processing 10222 of the synchronous information output processing unit executed after the waiting for the predetermined period of time issues an occupancy lock request to the synchronous control resource 1023 (102221). In this case, the share lock (102111) obtained by the processing 10211 of the data operation control unit with respect to the TRN 2 has already been released. Therefore, it is possible to obtain the occupancy lock. Then, the processing 10222 of the synchronous information output processing unit outputs synchronous information to the update log file A 17 (102222). When this processing is completed, the obtained occupancy lock of the synchronous control resource 1023 is released (102223).

Another case will be described where, during the processing 10222 of the synchronous information output processing unit, the processing 10212 of the data operation control unit that processes the transaction 3 (TRN 3) issues a share lock request to the synchronous control resource (102121).

On receiving a PREPARE-COMMIT request, the processing 10212 of the data operation control unit with respect to the TRN 3 issues the share lock request to the synchronous control resource 1023 (102121). When doing so, however, the processing 10222 of the synchronous information output processing unit has already obtained the occupancy lock, so the share lock request 102121 of the processing 10212 of the data operation control unit with respect to the TRN 3 ends in failure. The processing 10212 of the data operation control unit with respect to the TRN 3 waits until this occupancy lock is released.

When the occupancy lock is released by the processing 10222 of the synchronous information output processing unit (102223), the processing 10212 of the data operation control unit with respect to the TRN 3 obtains the share lock of the synchronous control resource 1023 (102122). Next, on receiving a COMMIT request, the processing 10212 of the data operation control unit with respect to the TRN 3 outputs a COMMIT log of the transaction 3 to the update log file A 17 (102123). When this processing is completed, the processing 10212 releases the lock of the synchronous control resource 1023 (102124).

As described above, in the DB access server, the data operation control unit 1021 and the synchronous information output processing unit 1022 perform exclusive control by locking the synchronous control resource 1023. For instance, in transaction processing, the data operation control unit 1021 obtains the share lock of the synchronous control resource during a processing period from reception of a PREPARE-COMMIT request to completion of processing corresponding to a COMMIT request. Under a state where the data operation control unit 1021 is obtaining the share lock of the synchronous control resource, processing from the synchronous information output processing unit 1022 is not accepted.

Through this processing, at a point in time when synchronous information is outputted (at a point in time when a synchronous point is obtained) as to every DB access server 102 constituting the extraction database management system 10, each generated transaction is placed under a state where the transaction is valid in every DB access server 102 (uniform valid) as well as a state where the transaction is not valid in any of the DB access servers 102 (uniform invalid).

Figure 8:
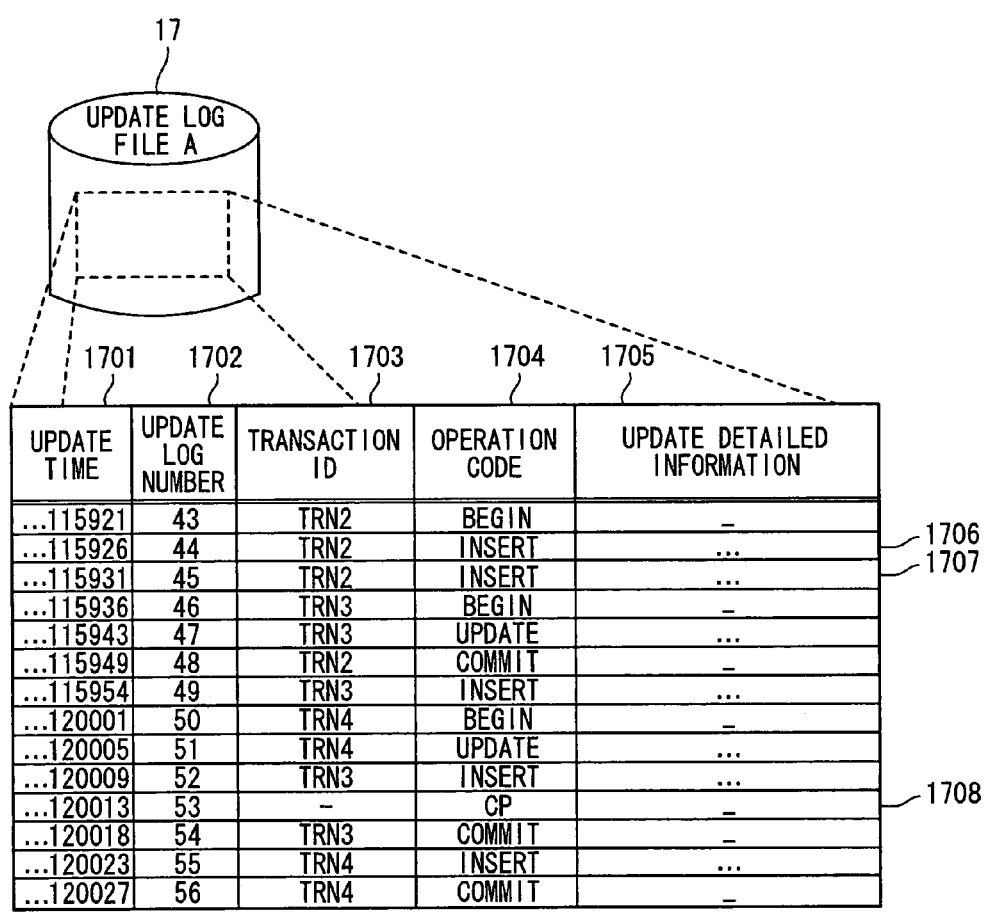
FIG. 8 is an explanatory diagram of the contents of an update log file according to the first embodiment.

FIG. 8 is a construction diagram of the update log file A 17 recorded by the processing shown in FIG. 7.

In the update log file A 17, update logs are recorded by the DB access server 102 so that they are arranged in units of operations constituting transactions in a time series manner. Each operation update log contains an update time 1701, an update log number 1702, a transaction ID 1703, an operation code 1704, and update detailed information 1705.

The update detailed information 1705 contains table information, column information, data before and after update, and the like of a corresponding update target. It should be noted that when the operation code is set as "CP", this indicates that the update log having this operation code is synchronous information. Therefore, in the example shown in FIG. 8, an update log 1708 is synchronous information.

The update log file is stored in the update information import queue of the import replication system 13 by the processing shown in FIG. 6. The import replication system 13 performs COMMIT processing with reference to a synchronous point shown by synchronous information in the update information import queue for import in the replica DB 23. When doing so, update logs of each transaction (transaction 2, in this example), whose COMMIT log was outputted and contents were determined before the synchronous information 1708, becomes update information. In other words, update. contents based on the update log 1706 and the update log 1707 are imported in the replica DB 23 by the COMMIT processing corresponding to the synchronous point shown by the synchronous information 1708.

It should be noted that in this embodiment, an example has been described in which the update log, whose operation code is "CP", is identified as synchronous information, although this invention is not limited to this method so long as information is used with which it is possible to identify the synchronous point.

Figure 9:
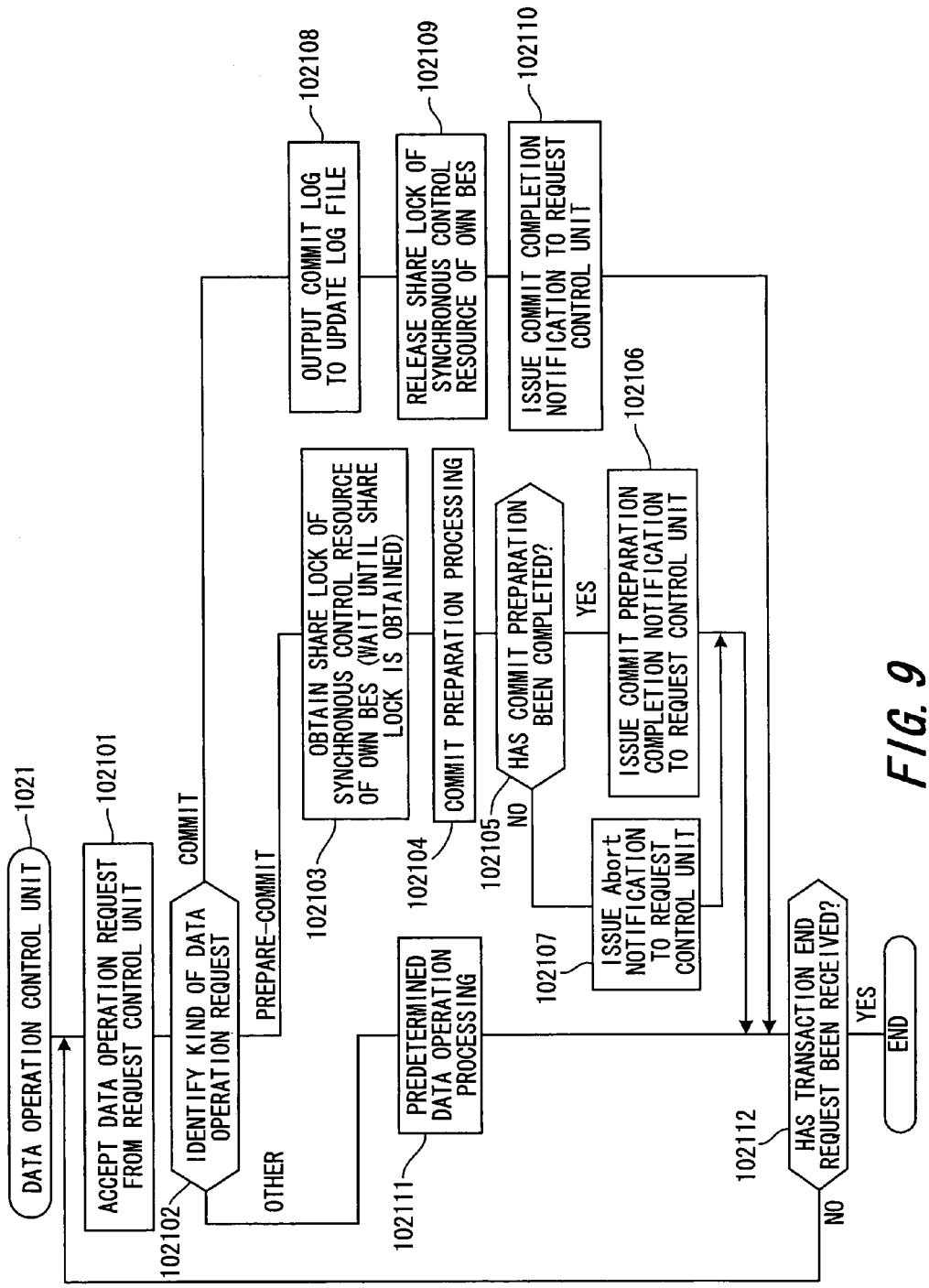
FIG. 9 is a flowchart of processing of a data operation control unit according to the first embodiment.

FIG. 9 is a flowchart of processing of the data operation control unit 1021.

First, in a step 102101, the data operation control unit 1021 receives a data operation request from the request control unit 1011 of the command request accept server 101. Then, in a step 102102, the data operation control unit 1021 identifies the kind of the data operation request.

When the data operation request is a PREPARE-COMMIT request, the processing proceeds to a step 102103 in which the data operation control unit 1021 obtains the share lock of the synchronous control resource 1023 of the DB access server 102 which contains the data operation control unit 1021. When doing so, when the occupancy lock has already been obtained by another processing and it is impossible to obtain the share lock, the data operation control unit 1021 waits until the share lock can be obtained. A case where the occupancy lock has been obtained corresponds to a case where synchronous information is being outputted with a synchronous point obtainment command.

Next, in a step 102104, the data operation control unit 1021 performs COMMIT preparation processing for processing of a current transaction. Then, in a step 102105, the data operation control unit 1021 judges whether the COMMIT preparation processing has been completed.

When the COMMIT preparation has been completed, the processing proceeds to a step 102106 in which the data operation control unit 1021 issues a COMMIT preparation completion notification to the request control unit 1011 that is the sender of the data operation request. Then, the processing proceeds to a step 102112. On the other hand, when the COMMIT preparation is not yet completed, the processing proceeds to a step 102107 in which the data operation control unit 1021 issues an "abort" notification to the request control unit 1011. Then, the processing proceeds to the step 102112.

In the step 102102, when it is identified that the data operation request is a COMMIT request, the processing proceeds to a step 102108 in which the data operation control unit 1021 outputs a COMMIT log of the current transaction to the update log file. Next, in a step 102109, the data operation control unit 1021 requests the synchronous control resource 1023 of the DB access server 102 containing the data operation control unit 1021 to release the share lock that has been obtained. Next, in a step 102110, the data operation control unit 1021 issues a COMMIT completion notification to the request control unit 1011 that is the sender of the data operation request. Following this, the processing proceeds to the step 102112.

In the step 102102, when it is identified that the data operation request is neither a PREPARE-COMMIT request nor a COMMIT request, the processing proceeds to a step 102111 in which the data operation control unit 1021 performs predetermined data operation processing according to the data operation request. Then, the processing proceeds to the step 102112.

In the step 102112, the data operation control unit 1021 judges whether a transaction end request has been received from the request control unit 1011. When the transaction end request has been received, the processing is ended. On the other hand, when the transaction end request has not yet been received, the processing returns to the step 102101 and the data operation control unit 1021 receives the next data operation request.

As described above, the data operation control unit 1021 obtains the share lock of the synchronous control resource 1023 during a COMMIT processing period from the start of PREPARE-COMMIT processing to the end of COMMIT processing. Through this processing, the data operation control unit 1021 performs exclusive control with respect to processing at the time of execution of a synchronous point obtainment command. Also, with the share lock, lock obtainment waiting will not occur in COMMIT processing between processing in the data operation control units.

Figure 10:
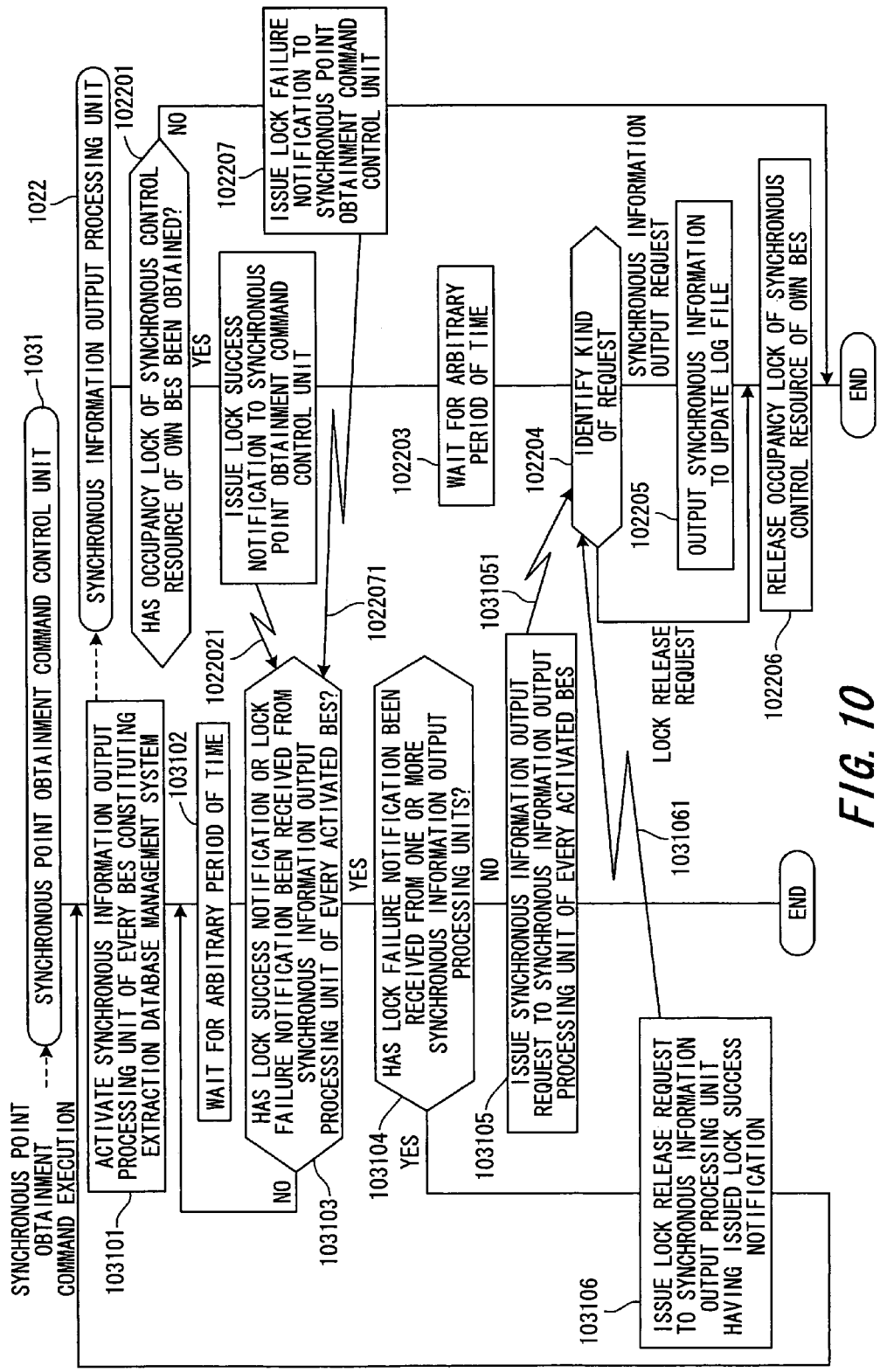
FIG. 10 is a flowchart of processing of a synchronous point obtainment command control unit and a synchronous information output processing unit according to the first embodiment.

FIG. 10 is a flowchart of processing of the synchronous point obtainment command control unit 1031 and the synchronous information output processing unit 1022.

Processing for obtaining a synchronous point is performed by the synchronous point obtainment command control unit 1031 of the system manager server 103 and the synchronous information output processing units 1022 of the DB access servers 102.

When a synchronous point obtainment command is executed by the extraction database management system 10, the processing by the synchronous point obtainment command control unit 1031 of the system manager server 103 is started.

In a step 103101, the synchronous point obtainment command control unit 1031 activates the synchronous information output processing unit 1022 of every DB access server 102 constituting the extraction database management system 10. Next, in a step 103102, until receiving a lock success notification 1022021 or a lock failure notification 1022071 from the activated synchronous information output processing unit 1022, the synchronous point obtainment command control unit 1031 waits for an arbitrary period of time. Then, in a step 103103, the synchronous point obtainment command control unit 1031 judges whether one of the lock success notification 1022021 and the lock failure notification 1022071 has been received from every synchronous information output processing unit 1022 activated in the step 103101.

When the synchronous point obtainment command control unit 1031 has not yet received the notification from every synchronous information output processing unit 1022, the processing returns to the step 103102 in which the synchronous point obtainment command control unit 1031 waits for an arbitrary period of time again.

On the other hand, when the synchronous point obtainment command control unit 1031 has received the notification from every synchronous information output processing unit 1022, the processing then proceeds to a step 103104 in which the synchronous point obtainment command control unit 1031 judges whether it has received the lock failure notification 1022071 from one or more synchronous information output processing units 1022. When every notification from the synchronous information output processing unit 1022 is the lock success notification 1022021, in other words, when every synchronous information output processing unit 1022 has obtained the occupancy lock of the synchronous control resource 1023, the processing proceeds to a step 103105 in which the synchronous point obtainment command control unit 1031 issues a synchronous information output request 1031051 to every activated synchronous information output processing unit 1022. Then, the processing is ended.

On the other hand, when it is judged in the step 103104 that the lock failure notification 1022071 has been received from one or more synchronous information output processing units 1022, in other words, when there exist any DB access servers 102 that are performing COMMIT processing of transactions, the processing proceeds a step 103106 in which the synchronous point obtainment command control unit 1031 issues a lock release request 1031061 to every synchronous information output processing unit 1022 issued the lock success notification. Then, the processing returns to the step 103101.

In a step 102201, each synchronous information output processing unit 1022 activated in the step 103101 tries to obtain the occupancy lock of the synchronous control resource 1023 of the DB access server 102 containing the synchronous information output processing unit 1022. When the synchronous information output processing unit 1022 has failed to obtain the occupancy lock, in other words, when the data operation control unit 1021 is performing COMMIT processing of a transaction, the processing proceeds to a step 102207 in which the synchronous information output processing unit 1022 issues the lock failure notification 1022071 to the synchronous point obtainment command control unit 1031. Then, the processing is ended.

On the other hand, when the synchronous information output processing unit 1022 has successfully obtained the occupancy lock, the processing proceeds to a step 102202 in which the synchronous information output processing unit 1022 sends the lock success notification 1022021 to the synchronous point obtainment command control unit 1031. Next, in a step 102203, the synchronous information output processing unit 1022 waits for an arbitrary period of time until a request is received from the synchronous point obtainment command control unit 1031.

Following this, when receiving a request from the synchronous point obtainment command control unit 1031, the processing proceeds to a step 102204 in which the synchronous information output processing unit 1022 judges whether the received request is the synchronous information output request 1031051 or is the lock release request 1031061.

When the received request is the synchronous information output request 1031051, the processing proceeds to a step 102205 in which the synchronous information output processing unit 1022 outputs synchronous information to the update log file. Then, in a step 102206, the synchronous information output processing unit 1022 releases the occupancy lock of the synchronous control resource 1023. Then, the processing is ended.

On the other hand, when the request received in the step 102204 is the lock release request 1031061, the processing proceeds to the step 102206 in which the synchronous information output processing unit 1022 releases the occupancy lock of the synchronous control resource 1023. Then, the processing is ended.

As described above, only when every synchronous information output processing unit 1022 has obtained the occupancy lock of the synchronous control resource 1023, in other words, only when there exists no data operation control unit 1021 that is performing COMMIT processing of a transaction, the synchronous information output processing unit 1022 outputs synchronous information to the update log file. Through this processing, a situation is prevented in which a COMMIT log crossing over a synchronous point is recorded in a certain transaction. As a result, at a synchronous point at which synchronous information was recorded, each transaction becomes one of a state of uniformly valid or a state of uniformly invalid in every DB access server 102.

Figure 11:
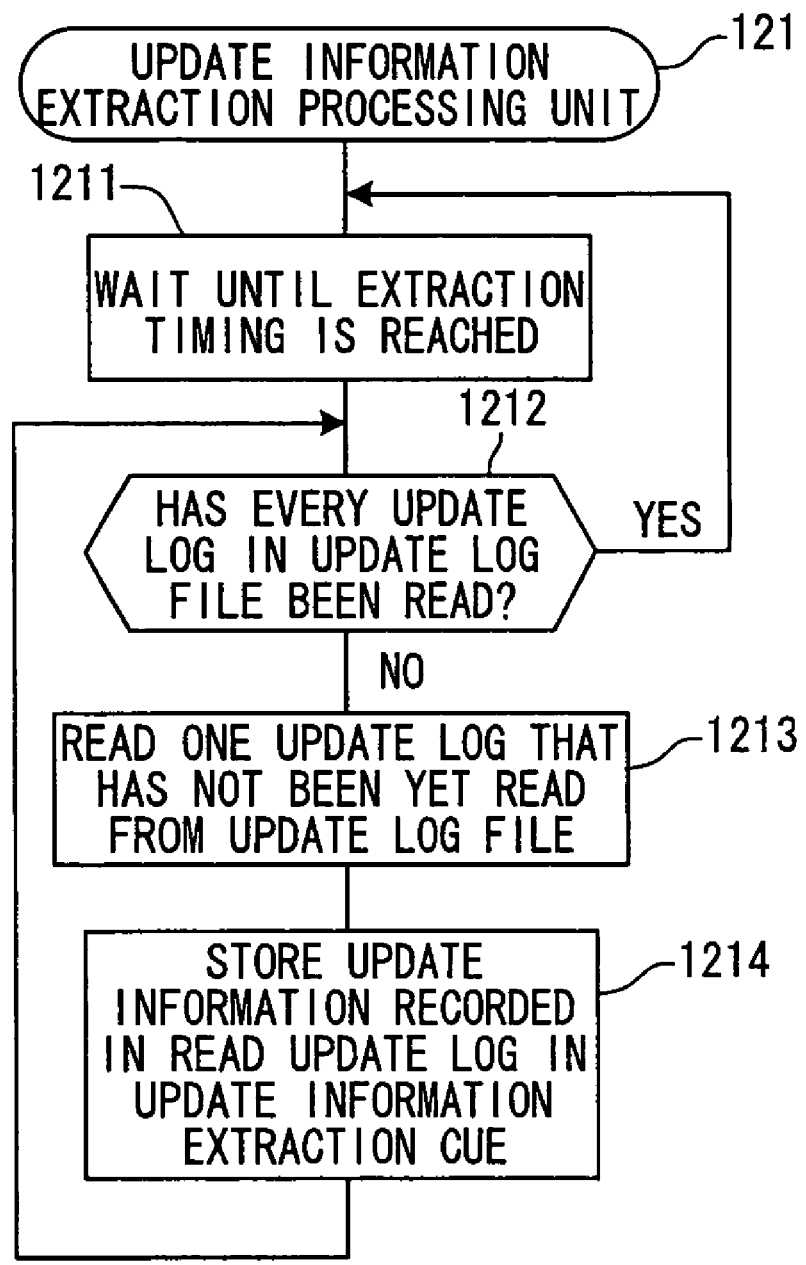
FIG. 11 is a flowchart of processing of an update information extraction processing unit according to the first embodiment.

FIG. 11 is a flowchart of processing of the update information extraction processing unit 121.

In a step 1211, the update information extraction processing unit 121 waits until an extraction timing is reached. The extraction timing is, for instance, periodic with predetermined intervals. Alternatively, the extraction timing may be a case where a threshold value set for the predetermined number of transactions or the predetermined number of update logs is exceeded.

In a step 1212, when judging that the extraction timing is reached, the update information extraction processing unit 121 judges whether every update log in the update log file (A 17 or B 18) has been read. When every update log has been read, the processing returns to the step 1211 and the update information extraction processing unit 121 waits until the next extraction timing is reached.

When there exist any update logs that has not yet been read, the processing proceeds to a step 1213 in which the update information extraction processing unit 121 reads one update log, which has not yet been read, from the update log file. Next, in a step 1214, the update information extraction processing unit 121 stores update information in the read update log in the update information extraction queue. Following this, the processing returns to the step 1212 in which the update information extraction processing unit 121 judges again whether every update log has been read.

Through this processing, the update information extraction processing unit 121 extracts update information from update logs in the update log file and stores it in the update information extraction queue.

Figure 12:
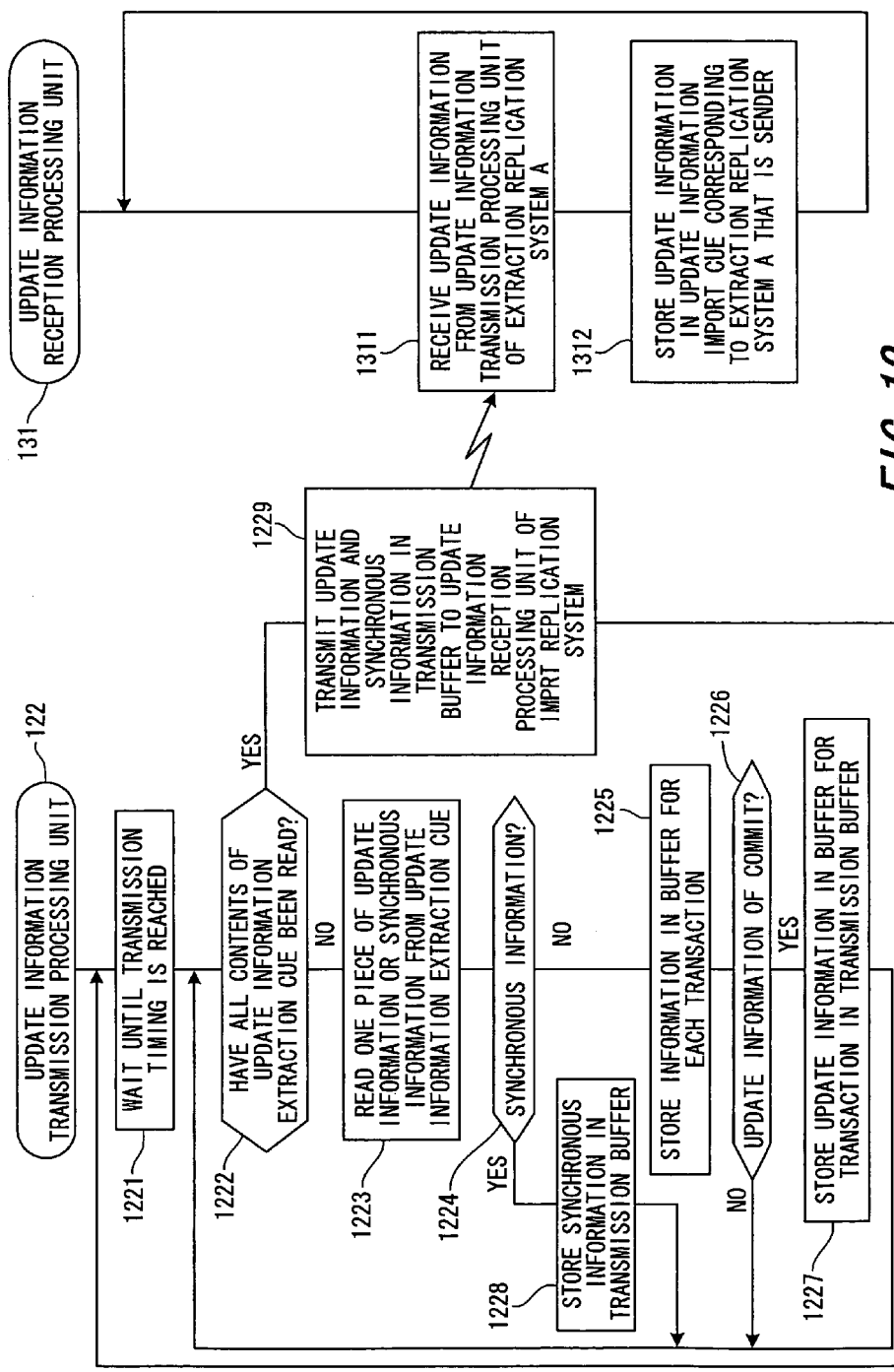
FIG. 12 is a flowchart of processing of an update information transmission processing unit and an update information reception processing unit according to the first embodiment.

FIG. 12 is a flowchart of processing of the update information transmission processing unit 122 and the update information reception processing unit 131.

In a step 1221, the update information transmission processing unit 122 waits until a timing for transmitting update information is reached. The transmission timing is, for instance, periodic with predetermined intervals. Alternatively, the transmission timing may be a case where the update information extraction queue has exceeded a predetermined amount.

In a step 1222, when the transmission timing is reached, the update information transmission processing unit 122 judges whether every piece of information stored in the update information extraction queue has been read. When every piece of information has been read, the processing proceeds to a step 1229 in which the update information transmission processing unit 122 transmits information and synchronous information stored in a transmission buffer to the update information reception processing unit 131 of the import replication system 13.

On the other hand, when there exist any pieces of update information that has not yet been read, the processing proceeds to a step 1223 in which the update information transmission processing unit 122 reads one piece of information (such as update information or synchronous information) from the update information extraction queue. Then, in a step 1224, the update information transmission processing unit 122 judges whether the read information is synchronous information.

When the read information is synchronous information, the processing proceeds to a step 1228 in which the update information transmission processing unit 122 stores the synchronous information in the transmission buffer. Then, the processing returns to the step 1222.

On the other hand, when it is judged that the read information is not synchronous information, the processing proceeds to a step 1225 in which the update information transmission processing unit 122 stores update information in a buffer provided for each transaction. Next, in a step 1226, the update information transmission processing unit 122 judges whether the update information stored in the buffer is update information of COMMIT. When the stored update information is update information of COMMIT, the processing proceeds to a step 1227 in which the update information transmission processing unit 122 stores the update contents of the transaction buffer in the transmission buffer. Then, the processing returns to the step 1222.

On the other hand, when it is judged that the update information stored in the buffer is not update information of COMMIT, the processing returns to the step 1222.

In a step 1311, the update information reception processing unit 131 receives the update information transmitted from the update information transmission processing unit 122 of the extraction replication system 12 in the step 1229. Then, in a step 1312, the update information reception processing unit 131 stores the received update information in the update information import queue corresponding to the extraction replication system 12 that is a sender. Following this, the processing returns to the step 1311 and the update information reception processing unit 131 waits for update information to be transmitted.

As described above, update information is read into the update information import queue corresponding to each extraction replication system 12 by the update information transmission processing unit 122 and the update information reception processing unit 131. When doing so, among update information stored in the update information extraction queue, only synchronous information and update information of each transaction that has already become valid are stored in order of transaction completion point.

Figure 13:
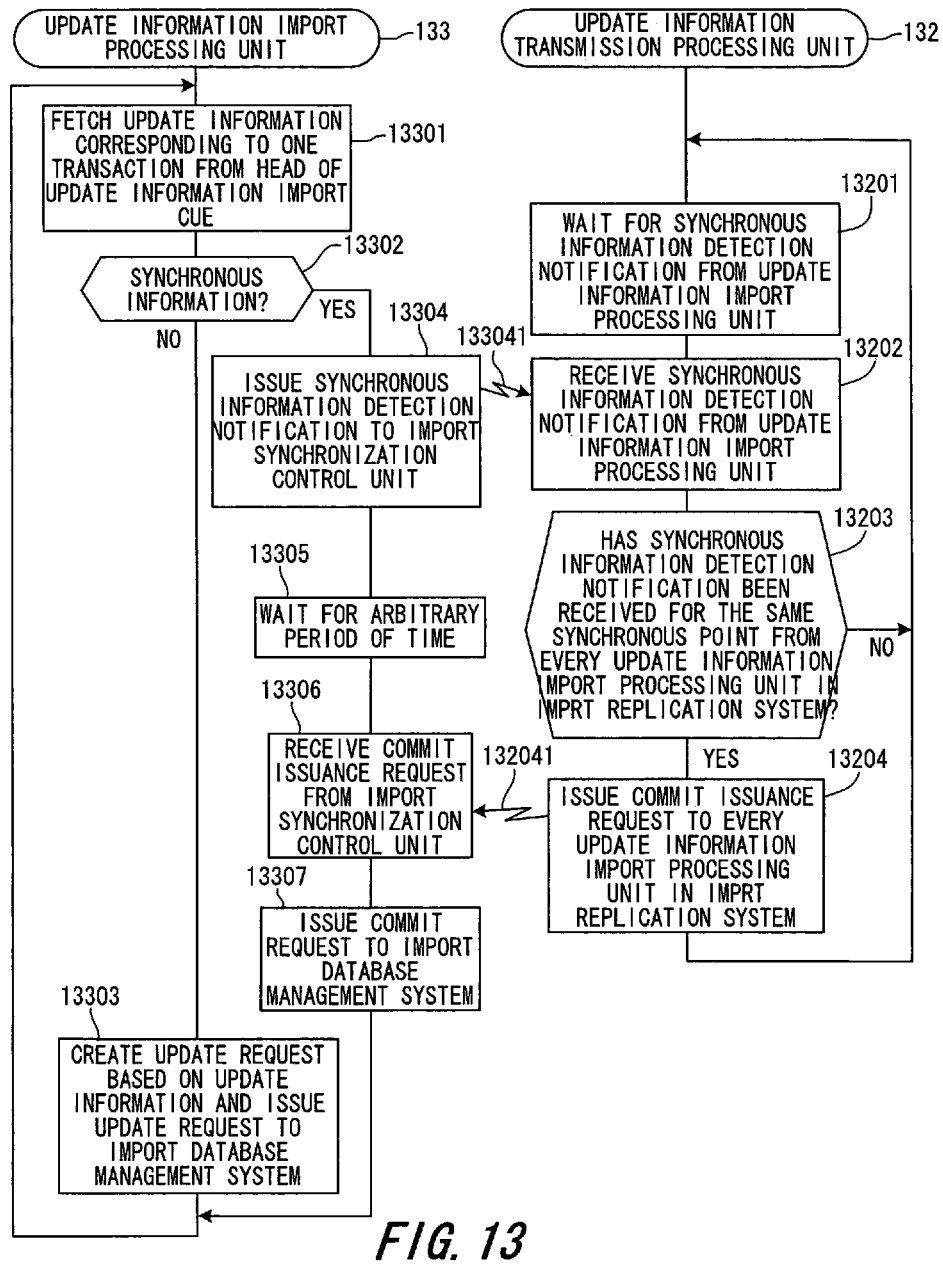
FIG. 13 is a flowchart of processing of an update information import processing unit and an import synchronization control unit according to the first embodiment.

FIG. 13 is a flowchart of processing of the update information import processing unit 133 and the import synchronization control unit 132.

In a step 13301, the update information import processing unit 133 fetches update information corresponding to one transaction from the head of the update information import queue. Then, in a step 13302, the update information import processing unit 133 judges whether the fetched information is synchronous information.

When the fetched information is not synchronous information, the processing proceeds to a step 13303 in which the update information import processing unit 133 creates an update request based on the fetched update information and issues the update request to the import database management system 14. Following this, the processing returns to the step 13301.

On the other hand, when it is judged that the fetched information is synchronous information, the processing proceeds to a step 13304 in which the update information import processing unit 133 sends a synchronous information detection notification 133041 to the import synchronization control unit 132. Then, in a step 13305, the update information import processing unit 133 waits for an arbitrary period of time until a COMMIT issuance request is issued from the import synchronization control unit 132.

When the COMMIT issuance request 132041 has been issued by the import synchronization control unit 132, the processing proceeds to a step 13306 in which the update information import processing unit 133 receives the COMMIT issuance request 132041. Then, in a step 13307, the update information import processing unit 133 sends a COMMIT request to the import database management system 14. Following this, the processing returns to the step 13301.

In a step 13201, the import synchronization control unit 132 waits for the synchronous information detection notification 133041 from the update information import processing unit 133.

Following this, in a step 13202, the import synchronization control unit 132 receives the synchronous information detection notification 133041 from the update information import processing unit 133. Then, in a step 13203, the import synchronization control unit 132 judges whether it has received the synchronous information detection notification 133041 for the same synchronous point from every update information import processing unit 133 in the import replication system 13.

When having received the synchronous information detection notification 133041 for the same synchronous point from every update information import processing unit 133, the processing proceeds to a step 13204 in which the import synchronization control unit 132 sends the COMMIT issuance request 132041 to every update information import processing unit 133 that is the sender of the synchronous information detection notification 133041. Following this, the processing returns to the step 13201 and the import synchronization control unit 132 waits for the synchronous information detection notification 133041 from the update information import processing unit 133.

On the other hand, when the import synchronization control unit 132 has not received the synchronous information detection notification 133041 for the same synchronous point from any one of update information import processing units 133, the processing returns to the step 13201 and the import synchronization control unit 132 waits for the synchronous information detection notification 133041 from the update information import processing unit 133.

As described above, the update information import processing unit 133 sends the synchronous information detection notification 133041 to the import synchronization control unit 132. When receiving the synchronous information detection notification 133041 from every update information import processing unit 133, the import synchronization control unit 132 sends a COMMIT issuance request to every update information import processing unit 133. On receiving the COMMIT issuance request, the import replication system 13 issues a COMMIT request. Through this processing, it becomes possible to establish synchronization of COMMIT request issuance to the import database management system 14 by each update information import processing unit 133.

It should be noted that each of the processing units and the control units described above is a unit realized by a program, an object, a process, or a thread.

In the first embodiment of this invention configured in the manner described above, in the extraction database management system 10, a timing, at which every transaction is uniformly valid or uniformly invalid in every DB access server 102 constituting the extraction database management system 10, is obtained as a synchronous point. The import replication system 13 receives update information and synchronous information from the extraction replication systems 12. Then, the import replication system 13 detects the timing of the received synchronous point and requests the import database management system 14 to import the update information in the replica DB 23 at the timing.

Through this processing, only update information that has become valid in every DB access server 102 is imported in the replica DB 23. As a result, a situation is prevented in which another host refers to a transaction that has not yet been determined in referring to the replica DB 23.

Next, a database system according to a second embodiment of this invention will be described.

In the second embodiment, the database system is configured so that replication generation processing is performed on a disk drive side. Each component that is the same as that in the first embodiment is given the same reference numeral and the description thereof will be omitted.

Figure 14:
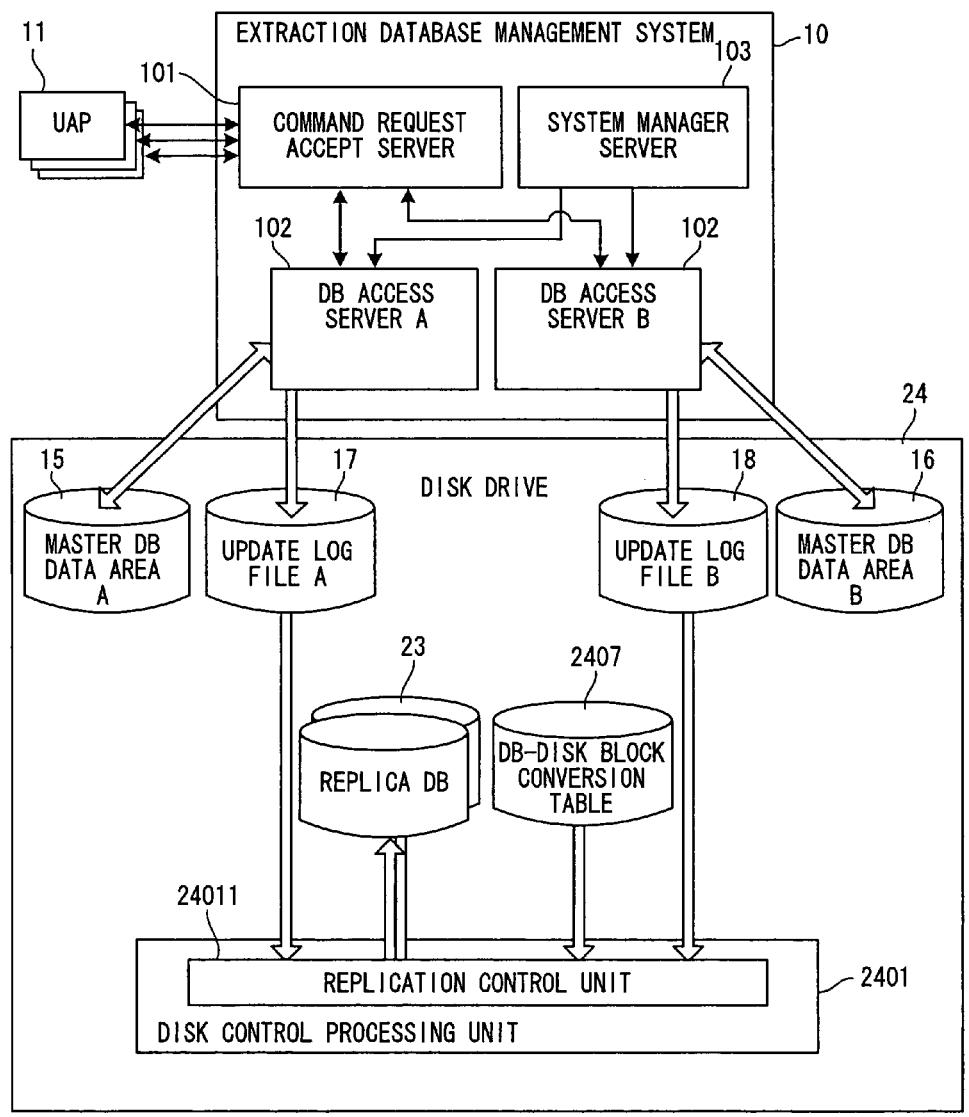
FIG. 14 is a block diagram of a database system according to a second embodiment.

FIG. 14 is a block diagram of the database system according to the second embodiment.

The database system according to the second embodiment includes an extraction database management system 10, which manages a master database, and a disk drive 24.

The extraction database management system 10 includes a command request accept server 101, a system manager server 103, and DB access servers (A and B) 102.

In the disk drive 24, a master DB data area A 15 and an update log file A 17 that the DB access server A 102 of the extraction database management system 10 manages and a master DB data area B 16 and an update log file B 18 that the DB access server B 102 of the extraction database management system 10 manages are stored. Also, the disk drive 24 stores therein a replica DB 23 that is a replica of the database. Further, the disk drive 24 stores therein a DB-disk block conversion table 2407 that is applied to replication processing.

Also, the disk drive 24 includes a disk control processing unit 2401. The disk control processing unit 2401 includes a replication control unit 24011.

The replication control unit 24011 extracts update contents from update logs stored in the update log file A 17 and the update log file B 18 and imports them in the replica DB 23. When doing so, the replication control unit 24011 refers to the DB-disk block conversion table 2407 and converts the position information of update data shown in the update information into physical position information on the disk drive 24. Then, the replication control unit 24011 updates data in the replica DB 23 on the disk drive 24 at a position indicated by the physical position information obtained through the conversion according to the update information.

It should be noted that the term "server" means a logical component in the database management system and does not mean a physical apparatus or a computer. The function of each server in this embodiment is realized by a program, an object, a process, or a thread. In a like manner, each "system" is also realized by a program, an object, a process, or a thread.

Figure 15:
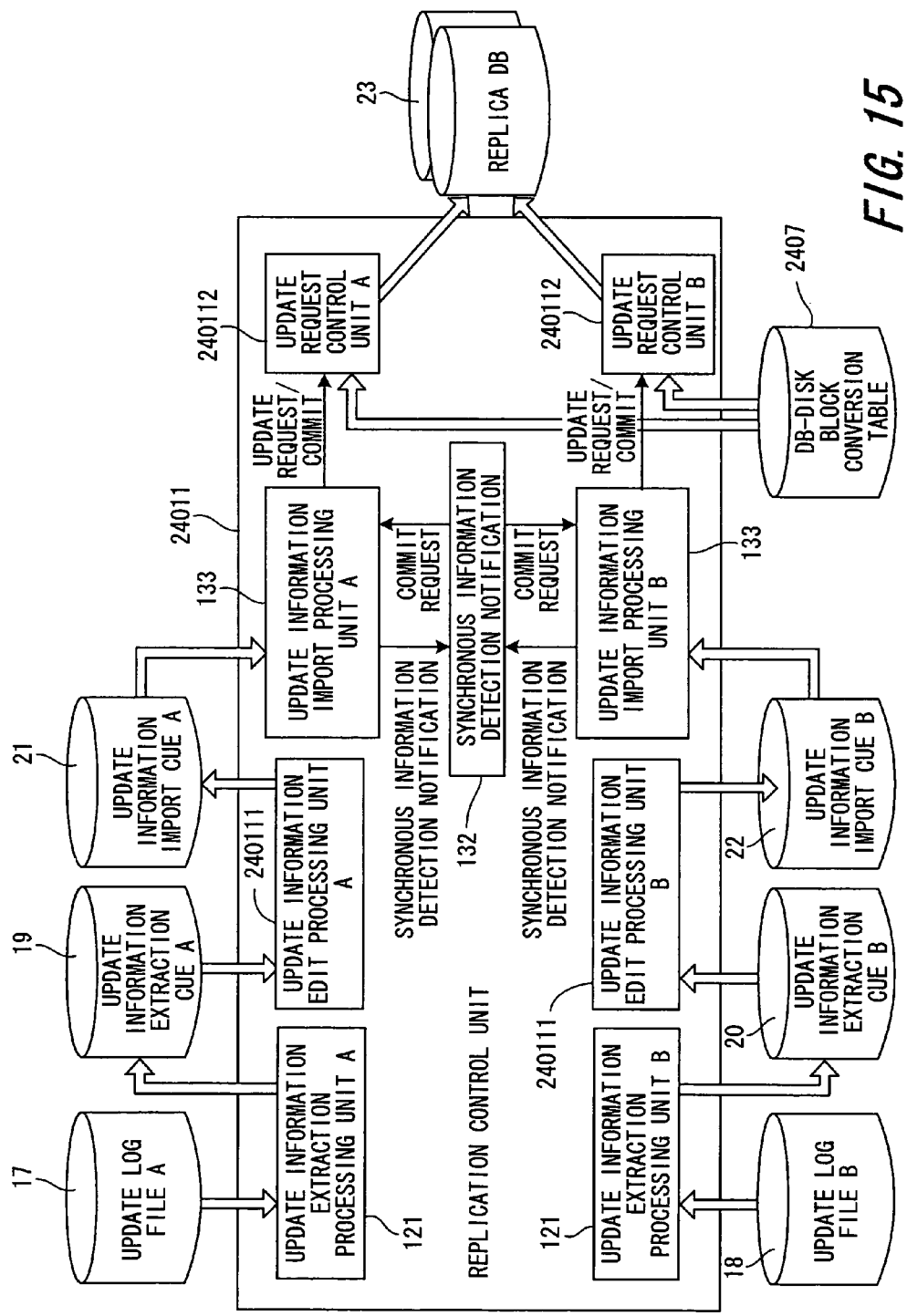
FIG. 15 is a functional block diagram of a replication control unit according to the second embodiment.

FIG. 15 is. a functional block diagram of the replication control unit 24011 according to this embodiment.

The replication control unit 24011 includes update information extraction processing units 121, update information import processing units 133, an import synchronization control unit 132, update information edit processing units 240111, and update request control units 240112.

Each update information extraction processing unit 121 extracts update information and synchronous information from its corresponding update log file (update log file A 17 or update log file B 18) managed by the extraction database management system 10. The update information extraction processing unit 121 extracts the update information and the synchronous information at a predetermined timing. Then, the update information extraction processing unit 121 stores the extracted update information and synchronous information in its corresponding update information extraction queue (update information extraction queue A 19 or update information extraction queue B 20).

Each update information edit processing unit 240111 extracts the update information stored in its corresponding update information extraction queue (update information extraction queue A 19 or update information extraction queue B 20) at a predetermined timing and stores the extracted update information in its corresponding update information import queue (update information import queue A 21 or update information import queue B 22) in order of transaction completion point. The processing of the update information edit processing unit 240111 will be described in detail with reference to FIG. 16.

Each update information import processing unit 133 reads the update information stored in its corresponding update information import queue (update information import queue A 21 or update information import queue B 22). Then, the update information import processing unit 133 generates an update request for the replica DB 23 and issues the update request to its corresponding update request control unit 240112.

Also, when detecting that the information read from the update information import queue is synchronous information, the update information import processing unit 133 issues a synchronous information detection. notification to the import synchronization control unit 132. After issuing the synchronous information detection notification, the update information import processing unit 133 waits until a COMMIT request is sent from the import synchronization control unit 132.

On receiving the synchronous information detection notification from an update information import processing unit 133, the import synchronization control unit 132 waits until it receives the synchronous information detection notification from every update information import processing unit 133. Then, when having received the synchronous information detection notification from every update information import processing unit 133, the import synchronization control unit 132 sends a COMMIT request to every update information import processing unit 133.

On receiving the COMMIT request from the import synchronization control unit 132, each update information import processing unit 133 sends the COMMIT request to its corresponding update request control unit 240112.

When receiving an update request from the update information import processing unit 133, the update request control unit 240112 stores it in an update request buffer. Also, when receiving a COMMIT request from the update information import processing unit 133, the update request control unit 240112 imports the update information stored in the buffer in the replica DB 23. When doing so, the update request control unit 240112 refers to the DB-disk block conversion table 2407 as to every piece of update information and converts the position information of update data shown in the update information into physical position information on the disk drive 24. Then, the update request control unit 240112 updates data in the replica DB 23 on the disk drive 24 at a position indicated by the physical position information obtained through the conversion according to the update information. The processing of the update request control unit 240112 will be described in detail with reference to FIG. 17.

Figure 16:
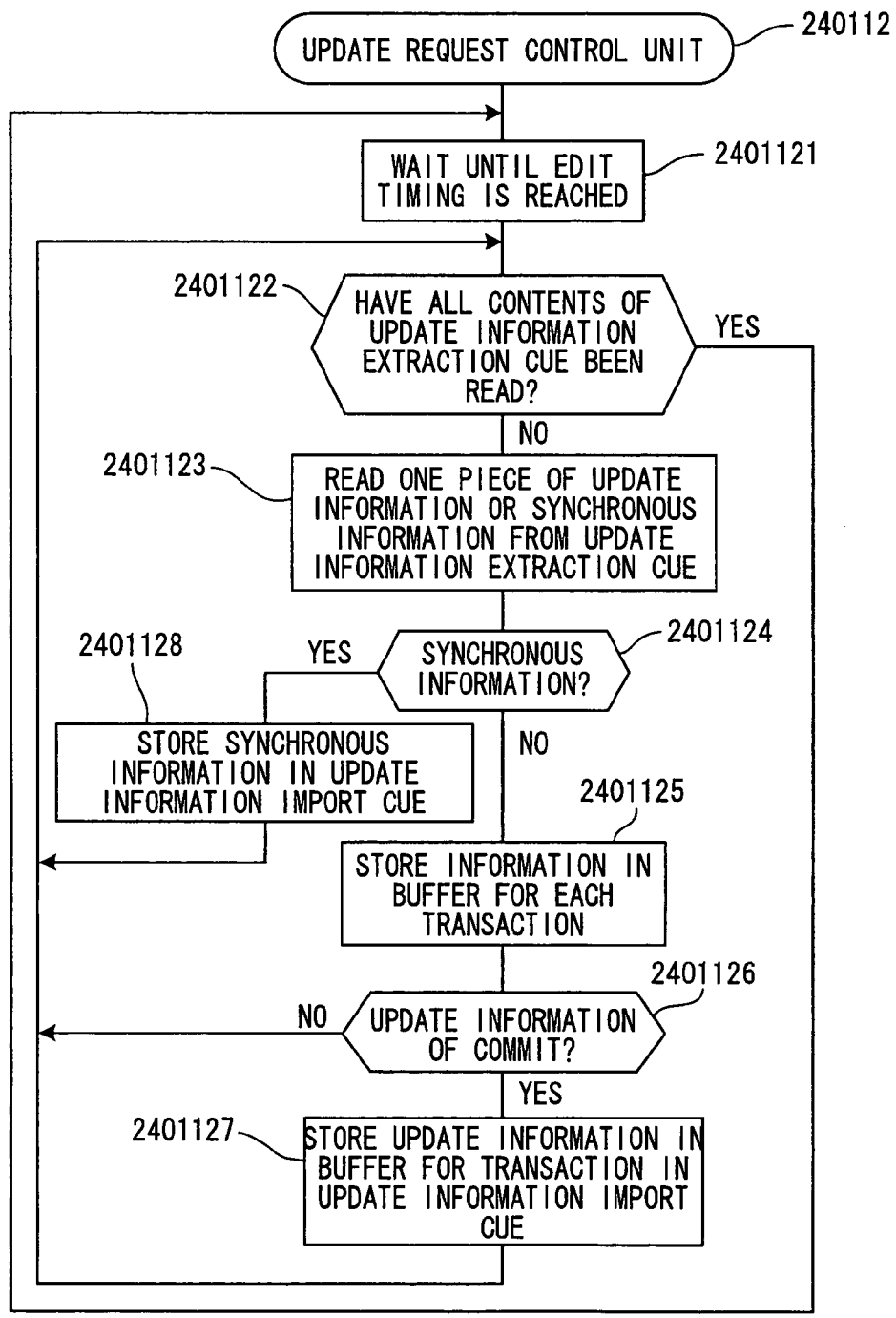
FIG. 16 is a flowchart of processing of an update information edit processing unit according to the second embodiment.

FIG. 16 is a flowchart of processing of the update information edit processing unit 240112.

In a step 2401121, the update information edit processing unit 240112 waits until an edit timing is reached. The edit timing may be, for instance, periodic with predetermined intervals. Alternatively, the edit timing may be a case where a threshold value set for the predetermined number of transactions or the predetermined number of update logs is exceeded.

When the edit timing is reached, the processing proceeds to a step 2401122 in which the update information edit processing unit 240112 judges whether every piece of information stored in the update information extraction queue 19 has been read. When every piece of information has been read, the processing returns to the step 2401121 and the update information edit processing unit 240112 waits until the next edit timing is reached.

On the other hand, when there exist any pieces of information that has not yet been read, the processing proceeds to a step 2401123 in which the update information edit processing unit 240112 reads one piece of information (such as update information or synchronous information) from the update information extraction queue. Then, in a step 2401124, the update information edit processing unit 240112 judges whether the read information is synchronous information.

When the read information is synchronous information, the processing proceeds to a step 2401128 in which the update information edit processing unit 240112 stores the synchronous information in the update information import queue. Then, the processing returns to the step 2401122.

On the other hand, when it is judged that the read information is not synchronous information, the processing proceeds to a step 2401125 in which the update information edit processing unit 240112 stores the update information in a buffer provided for each transaction. Next, in a step 2401126, the update information edit processing unit 240112 judges whether the update information stored in the buffer is update information of COMMIT. When the stored update information is update information of COMMIT, the processing proceeds to a step 2401127 in which the update information edit processing unit 240112 stores the update information in the transaction buffer in the update information import queue. Then, the processing returns to the step 2401122.

On the other hand, when it is judged that the update information stored in the buffer is not update information of COMMIT, the processing returns to the step 2401122.

As described above, update information is read into the update information import queue by the update information edit processing unit 240111. When doing so, among update information stored in the update information extraction queue, only synchronous information and update information of each transaction that has already become valid are stored in order of transaction completion point.

Figure 17:
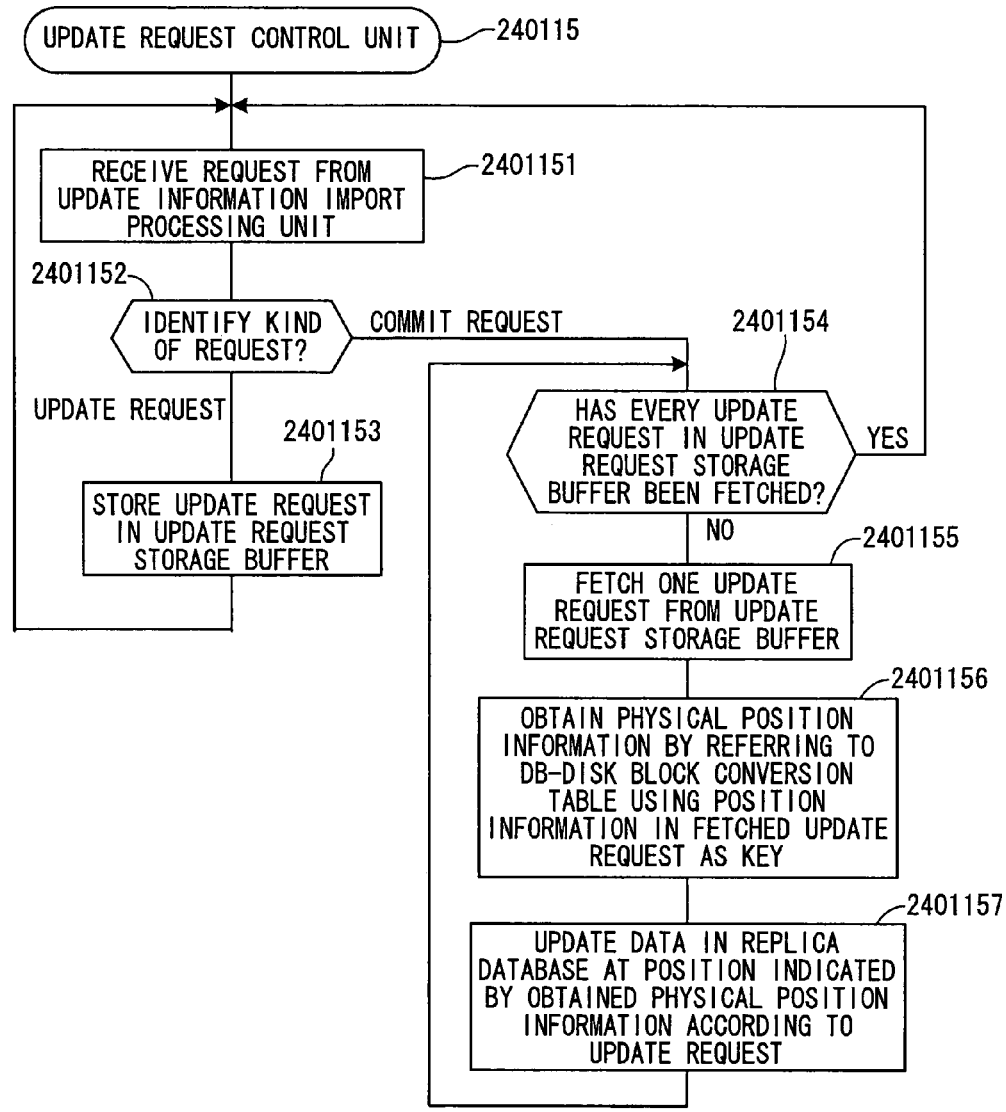
FIG. 17 is a flowchart of processing of an update request control unit. according to the second embodiment.

FIG. 17 is a flowchart of processing of the update request control unit 240115.

In a step 2401151, the update request control unit 240115 receives a request from the update information import processing unit 133. Then, in a step 2401152, the update request control unit 240115 identifies the kind of the received request.

When judging that the received request is an update request, the processing proceeds to a step 2401153 in which the update request control unit 240115 stores the request in an update request storage buffer. Then, the processing returns to the step 2401151.

On the other hand, when judging that the received request is a COMMIT request, the processing proceeds to a step 2401154 in which the update request control unit 240115 judges whether every update request in the update request storage buffer has been fetched.

When every update request in the update information storage buffer has been fetched, the processing returns to the step 2401151.

On the other hand, when every update request in the update information storage buffer has not yet been fetched, the processing proceeds to a step 2401155 in which the update request control unit 240115 first fetches one update request from the update request storage buffer.

Next, in a step 2401156, the update request control unit 240115 obtains physical position information showing a position in the replica DB 23 on the disk by referring to the DB-disk block conversion table 2407 using position information contained in the fetched update request as a key. Then, in a step 2401157, the update request control unit 240115 updates data existing on the disk at the physical position shown by the obtained position information according to the update request. Following this, the processing returns to the step 2401154.

As described above, the update request control unit 240112 does not perform update of data on the disk until a COMMIT request is received from the update information import processing unit 133. When a COMMIT request is received, the update request control unit 240112 updates data on the actual disk. Through this processing, it becomes possible to establish synchronization of import of update contents between update information import processing units 133.

As described above, in the second embodiment of this invention, like in the first embodiment, only update information that has become valid in every DB access server 102 is imported in the replica DB 23. Therefore, a situation is prevented in which another host refers to a transaction that has not yet been determined in referring to the replica DB 23.

In particular, even in a configuration where data areas of a database, update log files, and a replica DB are collectively managed on a disk drive (storage system) side, the same effect as in the first embodiment is provided.

It should be noted that this invention has been described above based on a parallel database system adopting a Shared-Nothing system, although this invention is also applicable to a system of shared database type in a like manner.

While the present invention has been described in detail and pictorially in the accompanying drawings, the present invention is not limited to such detail but covers various obvious modifications and equivalent arrangements, which fall within the purview of the appended claims.

What is claimed is:

1. A data processing method used in a database management system comprising a plurality of database management units for accessing data areas respectively allocated to the plurality of database management units by transactions, and for creating a replica database by recording update logs generated by the transactions wherein the transactions become valid upon being recorded in one or more of the update logs;

the database management system comprises a replica database management unit that manages the replica database, an extraction unit that extracts update information and synchronous information for creating the replica database from the update logs, and an import unit that causes the replica database management unit to import the extracted update information into the replica database, the data processing method comprising the steps of:

creating the synchronous information in response to a synchronous point obtainment command which establishes a synchronous point at which each transaction is designated as valid if the transaction is completed in every database management unit and invalid if it is not completed in every database management unit, said synchronous information being indicative of said synchronous point;

recording the synchronous information in the update logs at a timing at which at least one of the transactions generated is valid in every database management unit and all other transactions are invalid in every database management unit;

extracting from the update logs at a predetermined timing, with the extraction unit, the update information, for the transactions that were valid at the timing of recording the synchronous information and transactions that became valid between the timing of recording the synchronous information and the predetermined timing, and the synchronous information storing the extracted synchronous information and update information in a queue;

reading, in sequence from the queue, into an import database management system:

(1) update information for transactions that were valid at the timing of recording the synchronous information; and (2) the synchronous information;

after receiving confirmation of receipt of the synchronous information into the import database management system, importing into the replica database update information for transactions that were valid at the timing of recording the synchronous information; and after beginning importation into the replica database of the update information for transactions that were valid at the timing of recording the synchronous information, reading the update information that became valid between the timing of recording the synchronous information and the predetermined timing into the import database management system.

2. A database system comprising:

at least one computer having an interface communicating with a network;

a processor configured to execute a program; and a memory configured to store the program, wherein the computer, by executing the program, includes:

a plurality of database management units that access data areas respectively allocated thereto by transactions and record update logs generated by the transactions wherein the transactions become valid upon being recorded in one or more of the update logs;

a replica database management unit that manages a replica database;

an extraction unit that extracts update information and synchronous information for creating the replica database from the update logs; and an import unit that causes the replica database management unit to import the extracted update information into the replica database, wherein the plurality of database management units creates the synchronous information in response to a synchronous point obtainment command which establishes a synchronous point at which each transaction is designated as valid if the transaction is completed in every database management unit and invalid if it is not completed in every database management unit, said synchronous information being indicative of said synchronous point; and records the synchronous information in the update logs at a timing at which at least one of the transactions generated is valid in every database management unit and all other transactions are invalid in every database management unit, and wherein the extraction unit is adapted to:

extract from the update logs at a predetermined timing the update information, for the transactions that were valid at the timing of recording the synchronous information and transactions that became valid between the timing of recording the synchronous information and the predetermined timing, and the synchronous information, and store the extracted synchronous information and update information in a queue, and wherein the import unit is adapted to:

read, in sequence from the queue, into an import database management system of the import unit:

(1) update information for transactions that were valid at the timing of recording the synchronous information; and (2) the synchronous information;

after receiving confirmation of receipt of the synchronous information into the import database management system, import into the replica database update information for transactions that were valid at the timing of recording the synchronous information; and after beginning importation into the replica database of the update information for transactions that were valid at the timing of recording the synchronous information, read the update information that became valid between the timing of recording the synchronous information and the predetermined timing into the import database management system.

* * * * *